(12) United States Patent
Kadiri et al.

(10) Patent No.: US 10,972,950 B2
(45) Date of Patent: Apr. 6, 2021

(54) METHODS AND APPARATUS FOR HANDOVER ENHANCEMENTS

(71) Applicant: QUALCOMM Incorporated, San Diego, CA (US)

(72) Inventors: Prasad Reddy Kadiri, San Diego, CA (US); Karthika Paladugu, San Diego, CA (US); Amer Catovic, Carlsbad, CA (US); Umesh Phuyal, San Diego, CA (US); Alberto Rico Alvarino, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/459,173

(22) Filed: Jul. 1, 2019

(65) Prior Publication Data
US 2020/0029260 A1   Jan. 23, 2020

Related U.S. Application Data

(60) Provisional application No. 62/701,502, filed on Jul. 20, 2018.

(51) Int. Cl.
*H04W 36/00* (2009.01)
*H04W 36/08* (2009.01)
*H04J 3/00* (2006.01)

(52) U.S. Cl.
CPC ....... *H04W 36/0083* (2013.01); *H04W 36/08* (2013.01); *H04J 3/00* (2013.01)

(58) Field of Classification Search
CPC .................................................. H04W 36/0083
See application file for complete search history.

(56) References Cited

U.S. PATENT DOCUMENTS 8,538,436 B2 *  9/2013  Yu .................. H04W 36/165
                                                455/436
10,334,608 B2 *  6/2019  Lei .................... H04W 8/20
(Continued)

FOREIGN PATENT DOCUMENTS

WO    2011103745 A1    9/2011
WO    2018026401 A1    2/2018

OTHER PUBLICATIONS

Huawei et al., "Close to 0 ms HO Interruption Time for Single Tx/Rx UE", 3GPP Draft, 3GPP TSG-RAN WG2 #97bis, R2-1703382 Close to 0 ms HO Interruption Time for Single Tx-Rx UE, 3RD Generation Partnership Project (3GPP), Mobile Competence Centre, 650, Route Des Lucioles, F-06921 Sophia-Antipolis, vol. RAN WG2, No. Spokane, US, Apr. 3, 2017-Apr. 7, 2017, Apr. 3, 2017 (Apr. 3, 2017), XP051245244, pp. 1-8, Retrieved from the Internet: URL:http://www.3gpp.org/ftp/Meetings_3GPP_SYNC/RAN2/Docs/ [retrieved on Apr. 3, 2017].
(Continued)

*Primary Examiner* — Parth Patel
(74) *Attorney, Agent, or Firm* — Procopio, Cory, Hargreaves & Savitch LLP

(57) ABSTRACT

The present disclosure relates to methods and devices for a handover procedure which may include a user equipment (UE), first base station, and a second base station. In one aspect, the UE can receive an indication to handover from the first base station to the second base station. The UE may then establish a connection with the second base station. In another aspect, the UE can maintain a connection with the first base station over a period of time during the handover. The UE can also communicate with the first base station and the second base station during the period of time based on a time division multiplexing (TDM) pattern. The TDM pattern can comprise a pattern of subframes for communicating with the first and second base station. In another (Continued)

aspect, the UE can release the connection with the first base station at the end of the period of time.

44 Claims, 19 Drawing Sheets

(56) References Cited

U.S. PATENT DOCUMENTS

| | | | | |
|---|---|---|---|---|
| 10,349,460 | B2* | 7/2019 | Zhu | H04W 76/15 |
| 10,389,501 | B2* | 8/2019 | Yi | H04L 5/0042 |
| 10,568,011 | B2* | 2/2020 | Lin | H04W 76/12 |
| 10,638,390 | B2* | 4/2020 | Huang | H04W 36/08 |
| 2005/0050084 | A1* | 3/2005 | Atm | G06F 9/4486 |
| 2009/0129296 | A1* | 5/2009 | Grinshpun | H04W 36/026 |
| | | | | 370/261 |
| 2009/0207794 | A1* | 8/2009 | Meylan | H04W 76/28 |
| | | | | 370/329 |
| 2009/0247156 | A1* | 10/2009 | Sampath | H04W 52/0229 |
| | | | | 455/434 |
| 2010/0040020 | A1* | 2/2010 | Chen | H04W 36/0022 |
| | | | | 370/331 |
| 2012/0184278 | A1* | 7/2012 | Chin | H04W 36/0072 |
| | | | | 455/438 |
| 2012/0213162 | A1* | 8/2012 | Koo | H04W 88/06 |
| | | | | 370/329 |
| 2012/0214489 | A1* | 8/2012 | Koo | H04W 36/0083 |
| | | | | 455/436 |
| 2012/0281573 | A1* | 11/2012 | Kazmi | H04W 8/26 |
| | | | | 370/252 |
| 2013/0070656 | A1* | 3/2013 | Chin | H04W 68/02 |
| | | | | 370/311 |
| 2013/0195013 | A1* | 8/2013 | Ahn | H04W 72/1215 |
| | | | | 370/328 |
| 2013/0201959 | A1* | 8/2013 | Guo | H04W 52/40 |
| | | | | 370/331 |
| 2013/0223239 | A1* | 8/2013 | Yang | H04W 36/0088 |
| | | | | 370/252 |
| 2013/0242833 | A1* | 9/2013 | Ahn | H04W 72/0453 |
| | | | | 370/311 |
| 2013/0258895 | A1* | 10/2013 | Kim | H04L 5/0055 |
| | | | | 370/252 |
| 2013/0343241 | A1* | 12/2013 | Niu | H04L 1/0045 |
| | | | | 370/280 |
| 2014/0022972 | A1* | 1/2014 | Ahn | H04W 36/0033 |
| | | | | 370/311 |
| 2014/0120916 | A1* | 5/2014 | Du | H04W 36/28 |
| | | | | 455/436 |
| 2014/0348146 | A1* | 11/2014 | Malkamaki | H04W 72/044 |
| | | | | 370/337 |
| 2015/0155984 | A1* | 6/2015 | Peng | H04L 5/0051 |
| | | | | 370/329 |
| 2015/0215827 | A1* | 7/2015 | Zhang | H04W 28/0247 |
| | | | | 370/331 |
| 2016/0014753 | A1* | 1/2016 | Wu | H04W 74/0833 |
| | | | | 370/280 |
| 2016/0029213 | A1* | 1/2016 | Rajadurai | H04W 76/16 |
| | | | | 380/283 |
| 2016/0057687 | A1* | 2/2016 | Horn | H04W 36/30 |
| | | | | 370/331 |
| 2016/0066228 | A1* | 3/2016 | Fan | H04W 36/08 |
| | | | | 370/331 |
| 2016/0128084 | A1* | 5/2016 | Novlan | H04W 72/1268 |
| | | | | 370/329 |
| 2016/0143035 | A1* | 5/2016 | Xue | H04W 72/048 |
| | | | | 370/329 |
| 2016/0164622 | A1* | 6/2016 | Yi | H04L 5/14 |
| | | | | 370/280 |
| 2016/0174095 | A1* | 6/2016 | Damnjanovic | H04W 36/24 |
| | | | | 370/252 |
| 2016/0205577 | A1* | 7/2016 | Lunden | H04W 24/10 |
| | | | | 370/252 |
| 2016/0212636 | A1* | 7/2016 | Dimou | H04W 48/10 |
| 2016/0262066 | A1* | 9/2016 | Ozturk | H04W 36/026 |
| 2017/0142618 | A1* | 5/2017 | Hahn | H04W 36/0094 |
| 2017/0311339 | A1* | 10/2017 | Xu | H04W 52/365 |
| 2017/0374578 | A1* | 12/2017 | Selvaganapathy, Sr. | H04W 28/08 |
| 2018/0049181 | A1* | 2/2018 | Wu | H04W 72/048 |
| 2018/0092085 | A1* | 3/2018 | Shaheen | H04W 72/048 |
| 2018/0098250 | A1* | 4/2018 | Vrzic | H04W 36/18 |
| 2018/0176839 | A1* | 6/2018 | Ohara | H04W 16/32 |
| 2018/0235008 | A1* | 8/2018 | Park | H04W 74/0808 |
| 2018/0295544 | A1* | 10/2018 | Feng | H04W 36/30 |
| 2018/0352491 | A1* | 12/2018 | Shih | H04W 36/0069 |
| 2018/0376393 | A1* | 12/2018 | Wu | H04W 36/18 |
| 2019/0007875 | A1* | 1/2019 | Gheorghiu | H04W 24/10 |
| 2019/0082493 | A1* | 3/2019 | Lee | H04L 1/0023 |
| 2019/0090169 | A1* | 3/2019 | Lu | H04W 76/12 |
| 2019/0098606 | A1* | 3/2019 | Sharma | H04B 7/0404 |
| 2019/0116541 | A1* | 4/2019 | Hong | H04W 36/36 |
| 2019/0124491 | A1* | 4/2019 | Lim | H04W 52/281 |
| 2019/0191410 | A1* | 6/2019 | Kim | H04W 52/0216 |
| 2019/0199503 | A1* | 6/2019 | Son | H04L 5/0094 |
| 2019/0239112 | A1* | 8/2019 | Rao | H04W 72/0406 |
| 2019/0253230 | A1* | 8/2019 | Loehr | H04L 1/1614 |
| 2019/0253945 | A1* | 8/2019 | Paladugu | H04W 36/0069 |
| 2019/0349976 | A1* | 11/2019 | Rudolf | H04W 72/1273 |
| 2019/0380138 | A1* | 12/2019 | Zhang | H04L 5/0055 |
| 2020/0022043 | A1* | 1/2020 | Pelletier | H04W 74/0833 |
| 2020/0029260 | A1* | 1/2020 | Kadiri | H04W 36/0083 |
| 2020/0077437 | A1* | 3/2020 | Stern-Berkowitz | H04W 74/02 |
| 2020/0205095 | A1* | 6/2020 | Strom | H04J 11/0076 |
| 2020/0235903 | A1* | 7/2020 | Kim | H04W 72/12 |

OTHER PUBLICATIONS

International Search Report and Written Opinion—PCT/US2019/040381—ISA/EPO—dated Sep. 9, 2019.

* cited by examiner

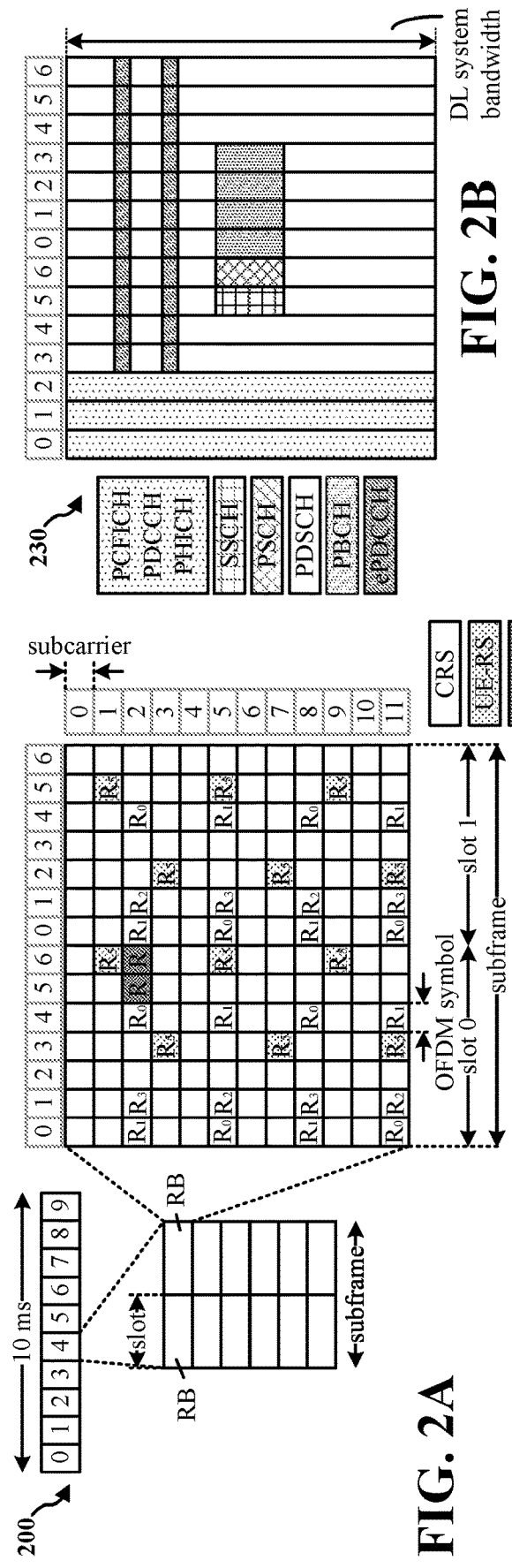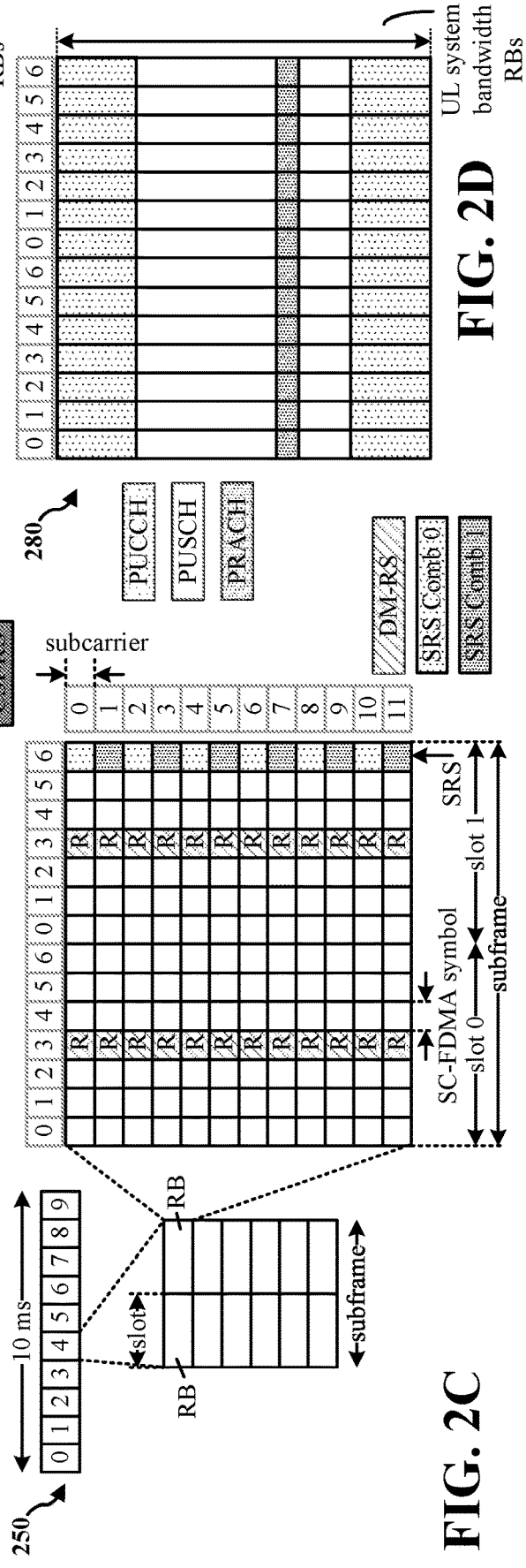
FIG. 2A  FIG. 2B  FIG. 2C  FIG. 2D

METHODS AND APPARATUS FOR HANDOVER ENHANCEMENTS

CROSS REFERENCE TO RELATED APPLICATION(S)

This application claims the benefit of U.S. Provisional Application Ser. No. 62/701,502, entitled "METHODS AND APPARATUS FOR HANDOVER ENHANCEMENTS" and filed on Jul. 20, 2018, which is expressly incorporated by reference herein in its entirety.

TECHNICAL FIELD

The present disclosure relates generally to communication methods and systems, and more particularly, to methods and apparatus related to handover procedures in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In one aspect, the UE may receive an indication, from a first base station serving the UE, to handover from the first base station to a second base station. The UE may then establish a connection with the second base station. In another aspect, the UE can maintain a connection with the first base station over a period of time during the handover. In another aspect, the UE can communicate with the first base station and the second base station during the period of time based on a TDM pattern.

In an aspect of the disclosure, a method, a computer-readable medium, and an apparatus are provided. The apparatus may be a first base station connected to a UE. In one aspect, the first base station may receive a measurement report from the UE. The first base station may exchange a time sharing pattern with a second base station. In another aspect, the first base station may transmit an indication to the UE to handover from the first base station to a second base station. The indication may further indicate the time sharing pattern for TDM communication with the first base station and the second base station over a period of time during the handover from the first base station to the second base station.

In an aspect of the disclosure, a method, a computer-readable medium, and an apparatus are provided. The apparatus may be a second base station. In one aspect, the second base station may exchange a time sharing pattern with a first base station for communication with a UE during a handover. The second base station may then establish a connection with the UE. In another aspect, the second base station may receive communication from the UE in a TDM pattern based on the time sharing pattern exchanged with the first base station. In further aspects, the communication may be received over a period of time during a handover.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a frame structure.

DETAILED DESCRIPTION

Figure 1:
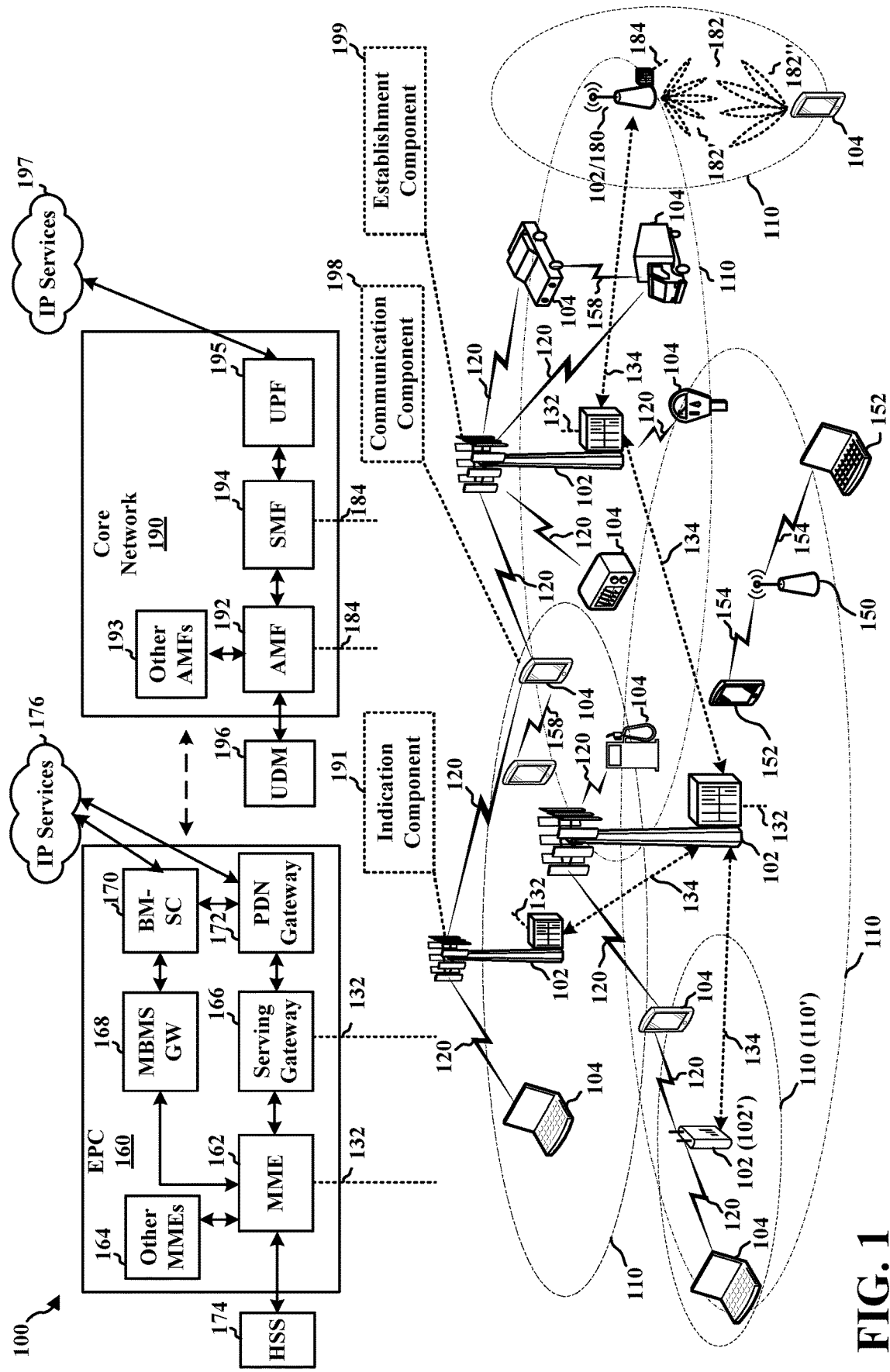
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may include an indication component 191 configured to receive a measurement report from a UE. Indication component 191 may also be configured to exchange a time sharing pattern with a second base station. Indication component 191 may also be configured to transmit an indication to a UE to handover from a first base station to a second base station.

Also, UE 104 may include a communication component 198 configured to receive an indication to handover from a first base station to a second base station. Communication component 198 may also be configured to establish a connection with a second base station. Communication component 198 may also be configured to maintain a connection with a first base station over a time period. Communication component 198 may also be configured to communicate with a first base station and a second base station during the time period based on a TDM pattern.

Additionally, base station 102 may include an establishment component 199 configured to exchange a time sharing pattern with a first base station. Establishment component 199 may also be configured to establish a connection with UE 104. Establishment component 199 may also be configured to receive a communication from UE 104 in a TDM pattern based on the time sharing pattern.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
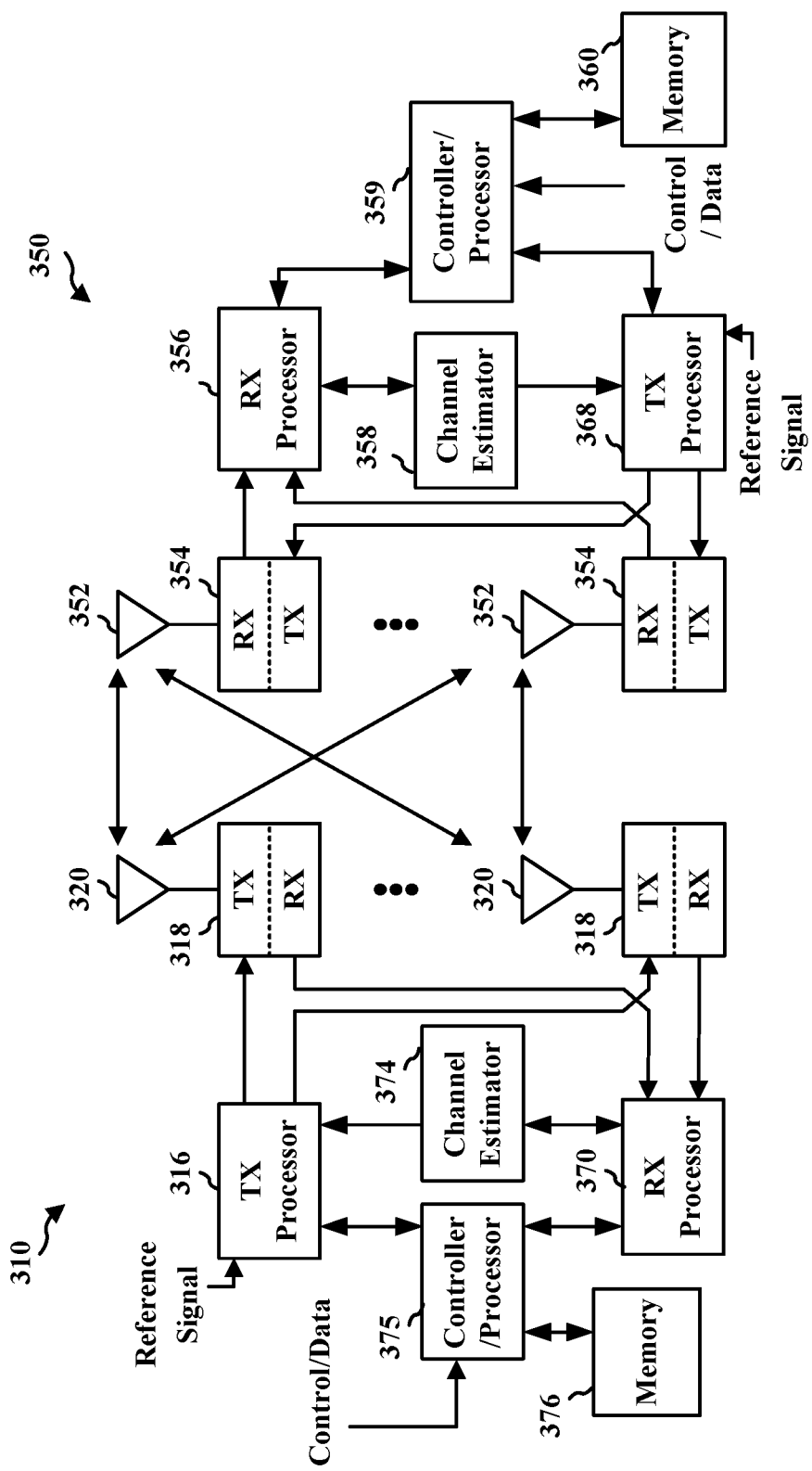
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 191 of FIG. 1.

At least one of the TX processor 316, the RX processor 370, and the controller/processor 375 may be configured to perform aspects in connection with 199 of FIG. 1.

Some aspects of the present disclosure can improve or enhance handover procedures in wireless communication systems. For instance, some aspects can improve the reliability of handover procedures. Other aspects of the present disclosure can reduce the failure rate of handover procedures. Further, aspects of the present disclosure can reduce instances of ping pongs within handover procedures. Yet other aspects of the present disclosure can improve latency requirements of handover procedures. For instance, the handover interruption latency can be reduced in order to meet real time and other ultra-reliable low latency communication (URLLC) applications.

In order to the aforementioned handover performance requirements, make-before-break (MBB) or enhanced MBB (eMBB) handovers can be utilized. Further, downlink control based call flow designs may be considered. In legacy handovers, the UE can start synchronizing to the target cell after it applies the RRC Reconfiguration in the handover command. In a MBB handover, the source base station can indicate the MBB handover in the handover request message, which in some instances can be part of an RRC container. In some aspects, during a MBB handover procedure, the wireless communication system can perform a target base station acquisition and synchronization. This can be performed using a second reception chain while still maintaining the reception/transmission connection with the source base station. In other aspects, during a MBB handover procedure, the wireless communication system can perform the remainder of handover procedure including and following resetting the MAC after the UE has stopped the uplink transmission or downlink reception with the source base station. In some aspects, the UE implementation can stop the uplink transmission or downlink reception with the source cell(s) to initiate re-tuning for connection to the target cell if makeBeforeBreak is configured. In other aspects of the present disclosure, handovers procedures without random access channel (RACH) or MBB handovers can be applied simultaneously.

Some aspects of the present disclosure can utilize various types of UE implementations. For example, UEs according to the present disclosure can support dual reception and dual transmission, dual reception and single transmission, and/or single reception and single transmission. Some aspects of the present disclosure can focus on potential the TDM patterns and signaling enhancements that can be utilized with single transmission UEs. For instance, some aspects can share a single common UE transmission between a source and target base stations during a handover procedure. In this manner, some disclosure aspects can share a single transmission between two base stations. Some advantages of using a single transmission between two base stations can be to improve the reception and reliability of the wireless communication system.

Figure 4:
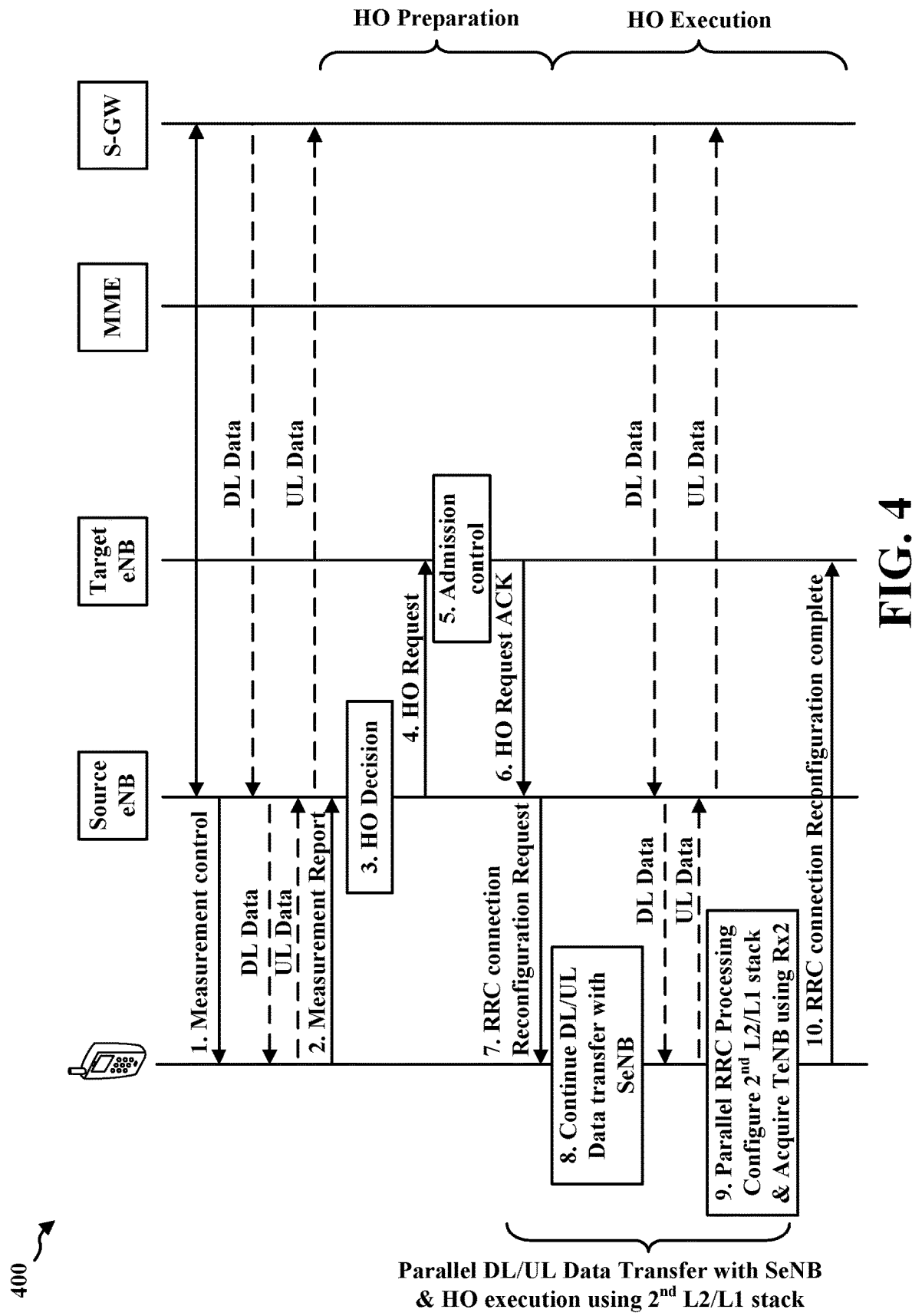
FIG. 4 illustrates a handover procedure in accordance with certain aspects of the present disclosure.

FIG. 4 illustrates a handover procedure 400 in accordance with certain aspects of the present disclosure. FIG. 4 displays that a UE can be connected to a source base station, such that downlink data can flow from the source base station to the UE and uplink data can flow from the UE to the source base station. In some aspects, the source base station can send a measurement control to a UE. The UE can send a measurement report in response to the measurement control. Next, the source base station can make a handover decision. In order to do so, the source base station can send a handover request to a target base station. The target base station can then perform an admission control and send a handover request acknowledgement (ACK). In some aspects, the source base station can then transmit an RRC connection reconfiguration request to the UE. The UE can continue to transfer uplink and downlink data with the source base station. Next, a parallel RRC processing can configure a second L2/L1 stack and acquire the target base station using a second reception or transmission. In some aspects, during this time, there can be a parallel downlink and uplink data transfer with the source base station and handover execution that can use the second L2/L1 stack. The UE can then transmit an RRC connection reconfiguration complete message to the target base station.

Figure 5:
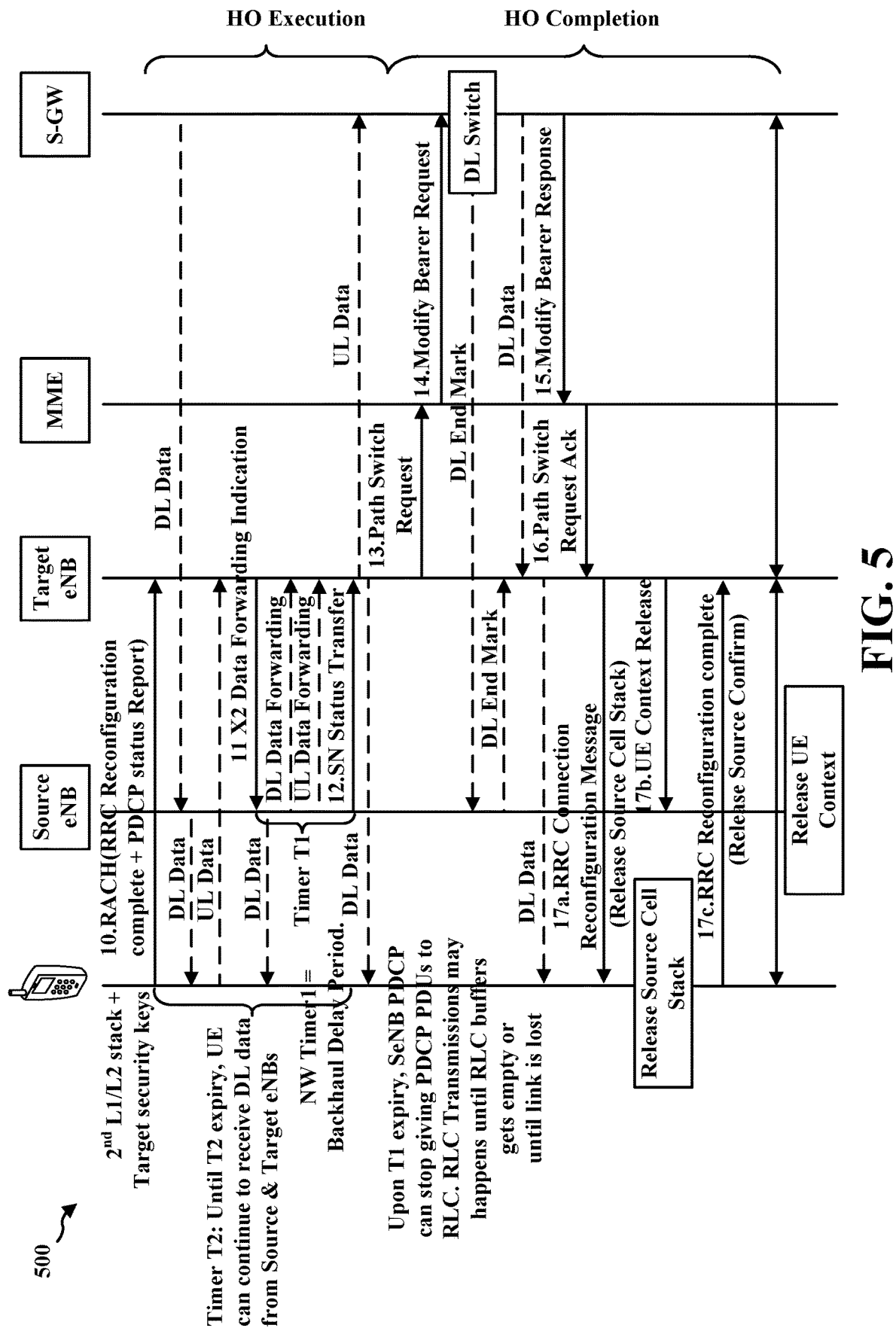
FIG. 5 illustrates a handover procedure in accordance with certain aspects of the present disclosure.

FIG. 5 illustrates a handover procedure 500 in accordance with certain aspects of the present disclosure. In some aspects, FIG. 5 displays a continuation of the handover procedure in FIG. 4. FIG. 5 illustrates that RACH message can be transmitted from the UE to the target base station. In some aspects, the RACH message can include an RRC reconfiguration complete message and/or a PDCP status report. The target base station can then transmit a data forwarding indication to the source base station. The source base station can then send a sequence number (SN) status transfer back to the target base station. In some aspects, the target base station can send a path switch request to a mobility management entity (MME) and the MME can send a modify bearer request to a serving gateway (S-GW). The S-GW can then perform a downlink switch and send a downlink end mark to the source base station. In some aspects, the S-GW can then send a modify bearer response message to the MME. The MME can also send a path switch request ACK to the target base station. In other aspects, the target base station can then transmit an RRC connection reconfiguration message to the UE, which can request to release the source cell stack. The UE can then release the source cell stack. The target base station can also transmit a UE context release message to the source base station. In some aspects, the UE can then transmit an RRC reconfiguration complete message, which can release a source confirmation. The UE and the target base station can then release the UE context.

In some aspects, the data forwarding indication and the path switch procedure can start in parallel. In further aspects, a time T1 can run from the data forwarding indication to the SN status transfer. In some aspects, upon the expiration of the T1 timer, the source base station PDCP can stop giving PDCP PDUs to a RLC. The RLC transmission may continue until the RLC buffer is empty or the link is severed. In other aspects, a timer T2 can run from the transfer of the RACH message to the SN status transfer. The UE may continue to receive downlink data from the source and target base stations until the expiration of the T2 timer. In some aspects, the T1 and T2 timers may not be required if the data forwarding delay is very small, e.g., 3-5 ms, which can simplify implementation. In further aspects, the trigger for the SN Status Transfer between the source and target base stations can be implementation based. Further, the RRC connection reconfiguration message and RRC reconfiguration complete messages can be used to release the UEs source cell connection the UE implementation based release trigger.

In some aspects, the UE can continue to communicate with the source base station even after the handover. For instance, some aspects of the present disclosure can utilize the TDM pattern to maintain communication with both the source and target base stations. For instance, based on the TDM pattern, some subframes can be sent to the source or target base station. In some aspects, based on the subframes designated for the source base station, the UE can continue transmitting to the source base station. In other aspects, based on the subframes designated for the target base station, the UE can transmit to the target base station.

Some aspects of the present disclosure can include procedures to deal with handover failure. For instance, in some aspects, if the RACH message to the source base station fails, the UE can indicate a handover failure indication to the source base station using an RRC Message. The source base station can also indicate the handover failure to the target base station. In some aspects, the UE can declare a radio link failure (RLF) if it fails to send the RACH message to the target base station and the source cell connection is lost. In other aspects, the UE may not be required to declare a RLF if the RACH message fails and the source cell connection is still active. In some aspects of the present disclosure, if there is a role switch failure, the UE can send a handover failure RRC signaling to the source base station, and the source base station can indicate the failure to the target base station. The UE can also send an RRC reconfiguration complete message to the source base station, instead of the target base station, as the source base station can act as master node. further, the master RRC and PDCP of the split bearer may be located at master node. In other aspects, the call flow can support signaling radio bearer (SRB) downlink and uplink split bearer. In some aspects, after the target base station is added as secondary base station, the uplink data can be sent to both the source and target base stations using an uplink split bearer. Further, uplink data can be sent to the Target base station if the uplink data radio bearer (DRB) is not configured as a split bearer. In other aspects, the uplink split bearer can send uplink data to one of the base stations.

Figure 6:
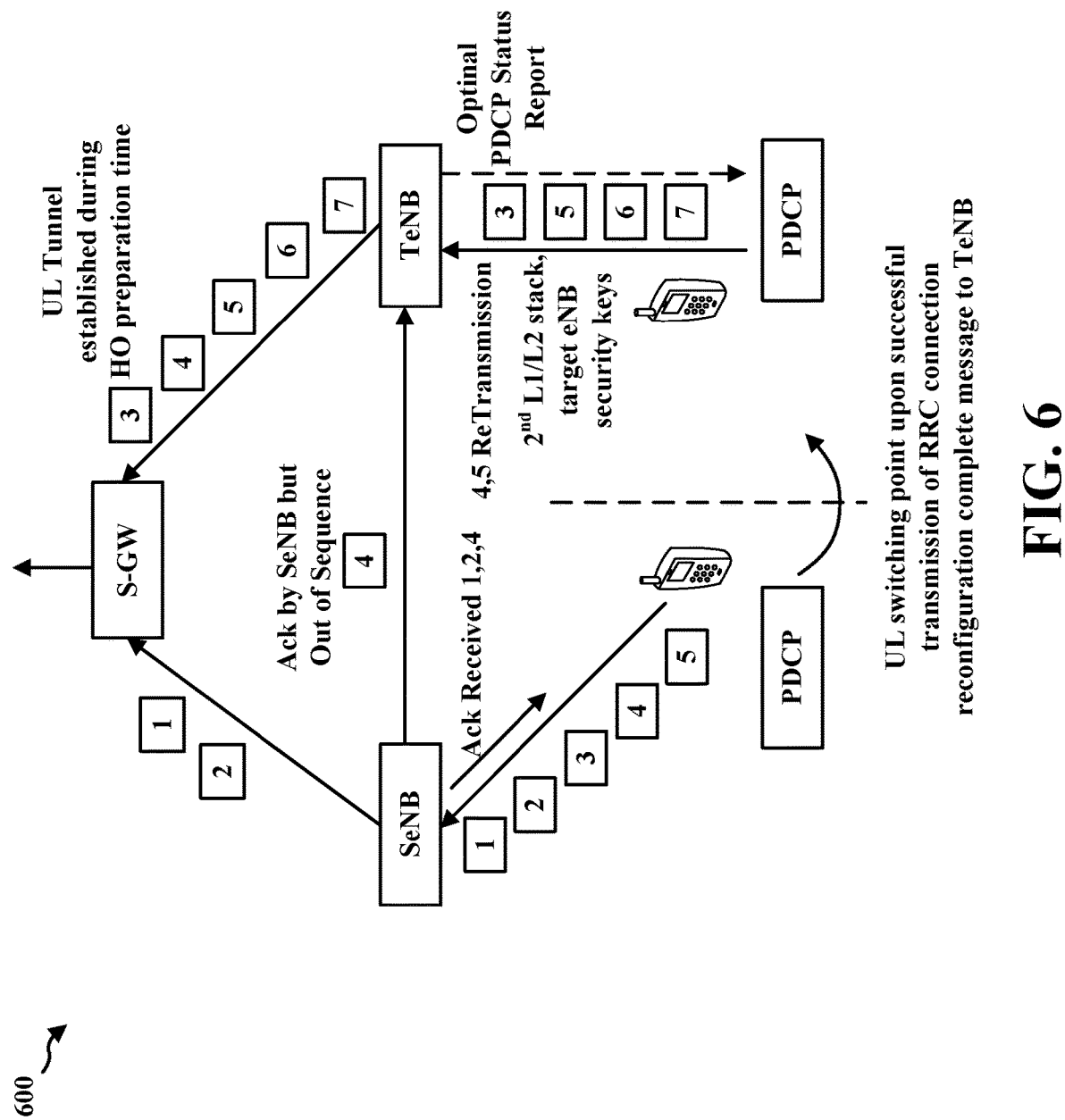
FIG. 6 illustrates a data transfer mechanism in accordance with certain aspects of the present disclosure.

FIG. 6 illustrates a data transfer mechanism 600 in accordance with certain aspects of the present disclosure. More specifically, FIG. 6 displays an uplink lossless data transfer mechanism for a handover procedure. In some aspects, the source base station can send an ACK for the data packets it receives. For instance, as shown in FIG. 6, the source base station can send an ACK for receiving data packets 1, 2, and 4, but not data packets 3 and 5. In some aspects, upon the successful transmission of the RRC connection reconfiguration complete message to the target base station, there can be an uplink switching point. In other aspects, the PDCP SN can continue after the handover. In some instances, the PDCP SN can continue for RLC acknowledged mode (AM) bearers. In yet other aspects, the data packets transferred between the source or target base stations and the S-GW may not have any associated PDCP SNs. In some aspects, for UEs capable of a single transmission, downlink data duplication may be needed during the handover execution. Further, for UEs capable of a single transmission, uplink data and ACKs/NACKs may be transmitted to one of the source or target base stations during the handover execution. In other aspects, for UEs capable of dual transmissions, downlink data duplication may be needed during handover execution. Further, for UEs capable of dual transmissions, uplink data can be transmitted to the source or target base station, and ACKs/NACKs may be transmitted to both the source and target base stations during the handover execution. Also, in some aspects, UEs capable of dual transmissions can send downlink data to both the source and target base stations.

Figure 7:
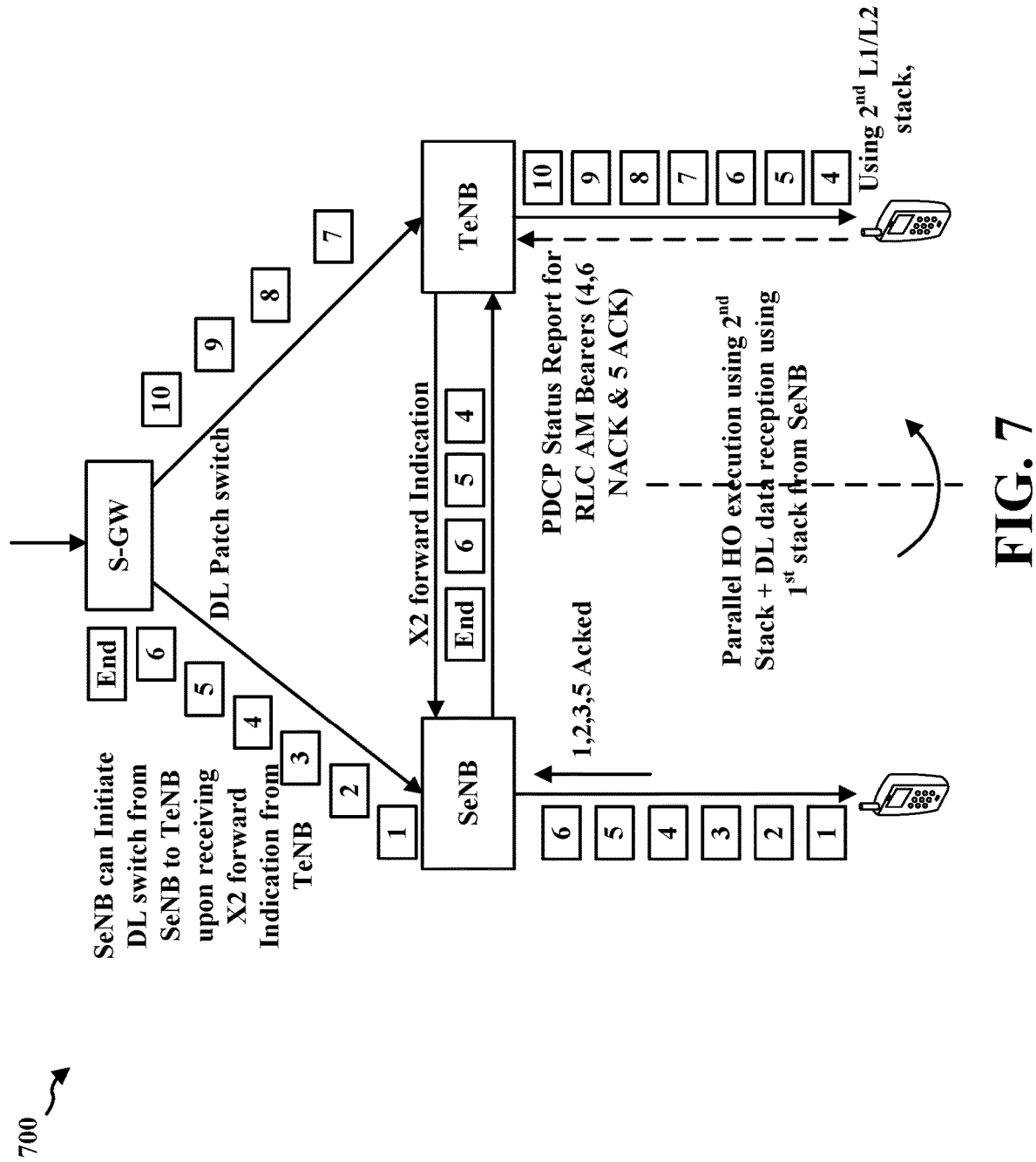
FIG. 7 illustrates a data transfer mechanism in accordance with certain aspects of the present disclosure.

FIG. 7 illustrates a data transfer mechanism 700 in accordance with certain aspects of the present disclosure. More specifically, FIG. 7 displays a downlink lossless data transfer mechanism for a handover procedure. FIG. 7 shows that, in some aspects, a source base station can initiate a downlink switch from the source base station to a target base station upon receiving a X2 forward indication from the target base station. Also, FIG. 7 displays that a UE can send an ACK for some data packets to the source base station. In some aspects, a parallel handover can be executed using a second stack and downlink data reception using a first stack from the source base station. Further, a PDCP status report for RLC AM bearers can be sent from the UE to the target base station. In some aspects, the PDCP SN can continue after the handover for RLC AM bearers. In other aspects, during the handover execution period, the UE can be expected to receive data from the source base station using the first stack and perform the handover execution using the second stack. In some aspects, some downlink packets, e.g., data packets 4, 5, and 6, may be duplicated on X2 and the source base station link upon receiving the X2 forward indication from the source base station. The source base station can also provide a status update report to the target base station indicating that a certain packet, e.g., packet 5, can receive an ACK. By doing so, the target base station may skip the transmission if it has not yet performed the transmission. In other aspects, for both dual and single transmission UEs, if some data packets, e.g., packets 4 and 6, do not receive an ACK from the UE to the source base station, the same data packets can be received by the UE from the target base station if the UE reports them as a NACK in the PDCP status report sent to the target base station.

Some aspects of the present disclosure can describe how UEs supporting single transmission communication may share a common transmission with both the source and target base stations during a handover procedure. By doing so, single transmission UEs can communicate data with both the source and target base stations during the handover. In some aspects, a TDM pattern may allow single transmission UEs to communicate data with both the source and target base stations during handover procedures. In these aspects, a single transmission UE may communicate with both base stations without losing connection with either base station during handover, which can facilitate low latency reliable handover enhancements. Further, by allowing single transmission UEs to communicate with both base stations, it can lower UE cost and reduce UE power consumption. Additionally, in some aspects, the UE can allocate full power to either the source or target base stations at any given instance.

In some aspects of the present disclosure, allowing single or dual transmission UEs to share transmissions between the source and target base stations can reduce handover interruption time. For example, transmission sharing for single or dual transmission UEs, e.g., UEs with no simultaneous dual transmission capability, can reduce handover interruption time by close to 0 ms. In some aspects, this can enable eMBB handover or dedicated control (DC) based handover with a single transmission chain or dual transmission chain in scenarios where a second transmission chain is not available or due to dual transmission restrictions. For example, this can allow for reliable handovers to take place when the UE capabilities and/or interference do not allow for a second transmission. In some aspects, this single transmission handover can be applicable when the service requirement delay budget is less than the handover interruption time, e.g., when using break-before-make handover. In further aspects, this single transmission handover can be applicable when the service requirement delay budget is greater than the uplink subframe interval. In these instances, some of the uplink subframes can be used to transmit to the target cell.

The transmission sharing techniques described herein can allow the device to time share a UE radio between a source and a target base station link during the establishment of a link at the target cell. For example, the sharing pattern can be sent in the handover command by the source cell. In some aspects, due to the UE transmission switching mechanism, there may exist additional signaling complexity for the subframe pattern exchange between the source and target base stations. In further aspects, the UE transmission switching functionality may be required.

Figure 8:
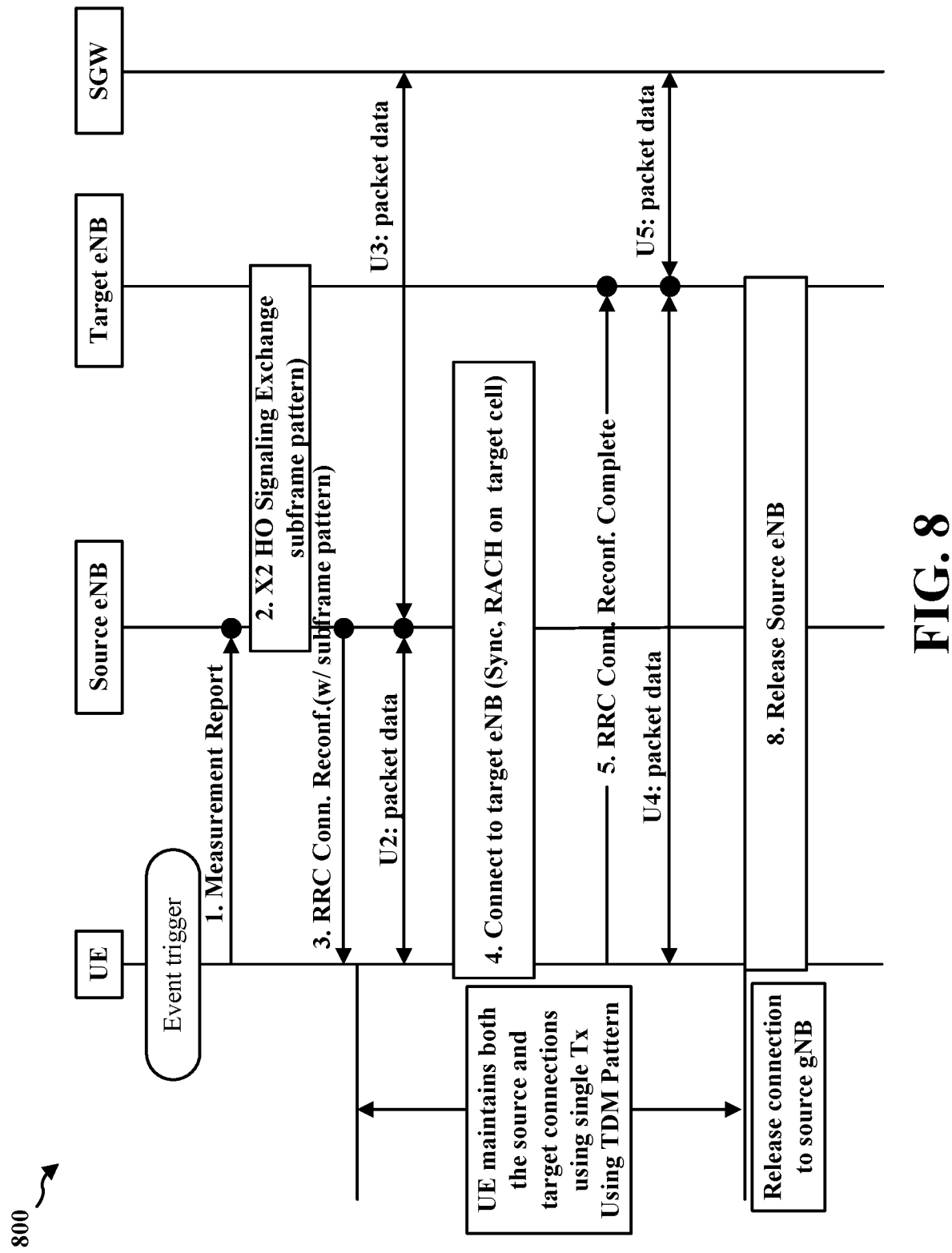
FIG. 8 illustrates a handover procedure in accordance with certain aspects of the present disclosure.

FIG. 8 illustrates a handover procedure 800 in accordance with certain aspects of the present disclosure. More specifically, FIG. 8 displays transmission sharing using a control plane handover procedure. As shown in FIG. 8, in some aspects, a UE can be connected to a source base station when a handover event is triggered. The UE can then send a measurement report to the source base station. The source base station can then implement an X2 handover signaling, wherein it can exchange a subframe pattern with the target base station. The source base station can then transmit a RRC connection reconfiguration message to the UE. The RRC connection reconfiguration message may include the subframe pattern. In some aspects, packet data can be exchanged between the UE and the source base station, as well as between the source base station and a S-GW. Next, the UE can connect to the target base station. This connection can take place using synchronization or a RACH procedure on a target cell. The UE can then transmit an RRC connection reconfiguration complete message to the target base station. Packet data can then be exchanged between the UE and the target base station. The UE can then release the connection with the source base station. The UE can maintain connections to both the source and target base stations and transmit to both base stations over a period of time during the handover procedure, e.g., using a TDM pattern. In some aspects, the UE can maintain connections to the source and target base stations from the time the UE receives the RRC connection reconfiguration message until the UE releases the connection with the source base station.

In some aspects, the transmission sharing subframe pattern may be exchanged as part of a context setup. For example, the transmission sharing subframe pattern may be exchanged based on the active services on the UE. Further, the transmission sharing subframe pattern may be sent over an X2 channel for the inter-base station handover. In other aspects, the eMBB or DC based handover may still be supported by using a TDM on the uplink between the source and target cell. Further, the subframe pattern can be tailored to support link establishment requirements, as well as shifting more uplink traffic to the target cell over time.

Some aspects of the present disclosure can support transmission sharing based on TDM pattern signaling. In these aspects, the TDM pattern can begin at the network, as well as the UE, when the UE receives an RRC connection reconfiguration message from the source base station. In other aspects, the TDM pattern can be stopped at the UE when the UE gets an explicit RRC message to release the source cell from the target station. In further aspects, the TDM pattern can be stopped at the UE when the UE successfully completes the handover to the target base station and releases the source base station stack connection. In further aspects, the TDM pattern can be stopped at the UE when the target base station sends a medium access control (MAC) control element (MAC-CE) to indicate the source cell release and/or the TDM pattern release.

In some aspects, the TDM pattern can be stopped at the network side when the target base station sends a UE context release message to the source base station. In further aspects, the TDM pattern can be stopped at the network side when implemented by the network or when the UE indicates a handover failure to the source base station. In further aspects, the TDM pattern can be stopped at the network side when the target base station sends a MAC-CE to release the TDM pattern to the UE.

Some aspects of the present disclosure can specify the TDM pattern in a variety of manners. The TDM pattern may be indicated using any of different example bit patterns. For instance, in some aspects, the TDM pattern can be specified by indicating radio frames. For example, the pattern may indicate even numbered radio frames, odd numbered radio frames, or any LTE TDD pattern based on radio frames. Some aspects of the disclosure can refer to this TDM pattern as bit pattern A. In other aspects, the TDM pattern can be specified by indicating subframes or subframes within specified radio frames. For example, the pattern may indicate even numbered subframes for the TDM pattern, odd numbered subframes for the TDM pattern, or any pattern of subframes based on an LTE TDD pattern. In some instances, the subframes can have a specific time interval, e.g., a 1 ms transmission time interval (TTI). Some aspects of the disclosure can refer to this TDM pattern as bit pattern B.

Aspects of the present disclosure can utilize any of the above patterns, e.g., bit pattern A or B or a combination of the two. Moreover, the networks can specify the TDM pattern. In some aspects, depending on the TDM pattern, the base stations may know which subframes are used by UE during the handover for uplink communication with the source base station and the target base station. Accordingly, in these aspects, the base station can implement source and target base station scheduling for both the downlink and the uplink based on the knowledge of the TDM pattern used by the UE.

Some aspects of the present disclosure can support transmission sharing based on the uplink transmission TDM pattern. In these aspects, the TDM transmission can be transmitted on certain frames and subframes on each of the source and target uplink transmission, e.g., according to the TDM pattern. In some aspects, the frames and subframes on the source and target uplink transmissions can be synchronous. In these instances, the UE may sacrifice certain uplink transmission on a connection due to the subframes being aligned. For example, as there can be complete overlap and synchronous transmission with the source and target base stations, UE may lose some of the transmissions. In other aspects, the frames and subframes on the source and target uplink transmissions can be asynchronous. In these instances, based on the timing offset, the UE may not be able to use some of the transmission subframe or symbol opportunities on the uplink. In some aspects, a portion of the subframe may be restricted from being transmitted. For example, the entire subframe may not be restricted from transmission. In further aspects, the base stations may allocate the transmission sharing pattern as function of a time division duplex (TTD) configuration. Moreover, in some aspects, an uplink transmission pattern for frequency division duplex (FDD) may be provided.

Figure 9:
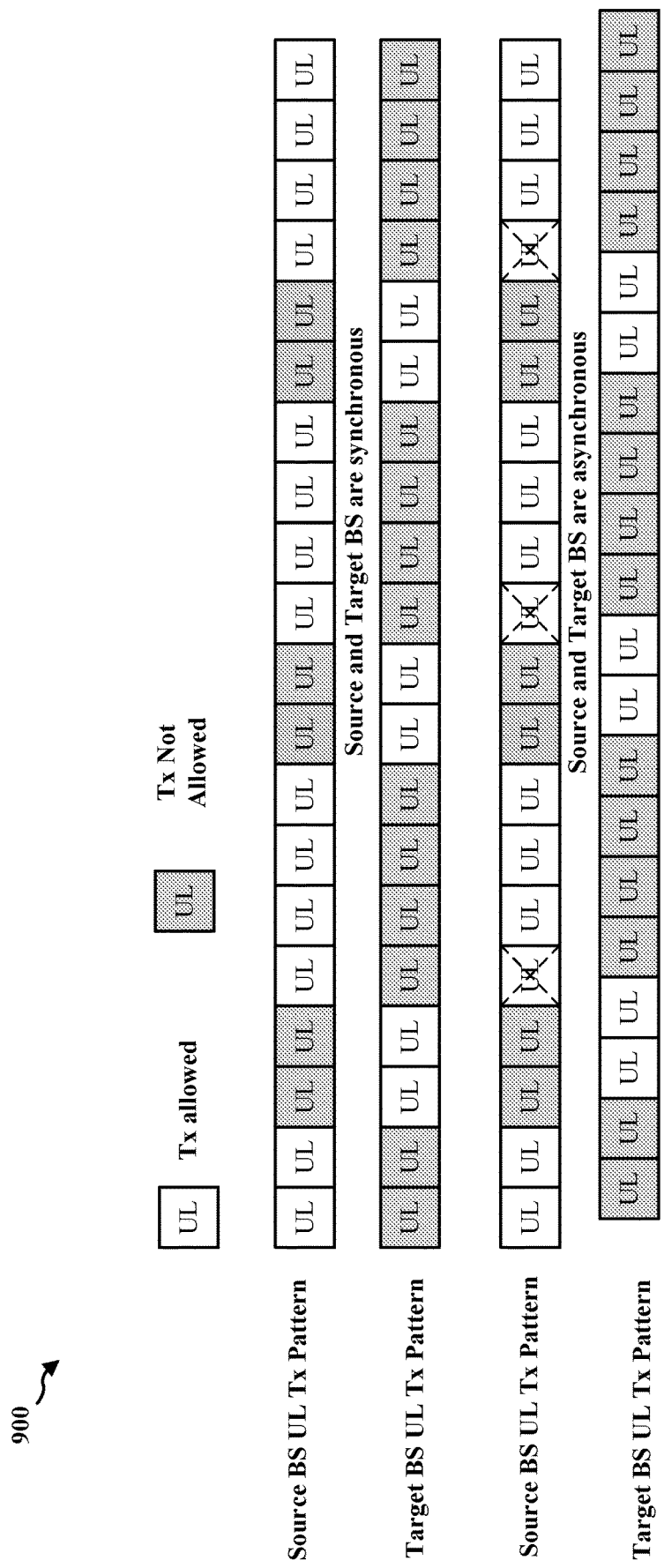
FIG. 9 illustrates a TDM pattern in accordance with certain aspects of the present disclosure.

FIG. 9 illustrates a TDM pattern 900 in accordance with certain aspects of the present disclosure. Although FIG. 9 illustrates UL transmission patterns, DL patterns may be identically or similarly configured. The TDM pattern may be agreed to or communicated between base stations and/or a UE as discussed herein. FIG. 9 displays two sets of uplink transmission patterns for both the source and target base stations. Each block in the transmission pattern in FIG. 9 can represent a unit of resources for data transmission. In one example, each of the blocks in the transmission pattern represents a subframe. In further examples, each of the blocks in the transmission pattern represents a frame, slot, or symbol. As shown in FIG. 9, the top two uplink transmission patterns display that the source and target uplink transmissions can be synchronous so that they are aligned in time. Likewise, the source and target downlink transmissions can also be synchronous. For example, the frames, subframes, slots, or symbols in the source and target uplink or downlink transmission patterns can be synchronous so that they are aligned in time.

As indicated above, in some aspects, the UE may be unable to use some of the blocks for the source base station as the TDM pattern reserves them for the target base station. Similarly, in some aspects, the UE may be unable to use some of the blocks for the target base station as the TDM pattern reserves them for the source base station. In this manner, the TDM pattern can indicate to the UE which blocks are allowed for transmission to a certain base station. By doing so, the UE can transmit to either the source base station or the target base station, but not both at the same time. In these aspects, if a specific block is available for the source base station in the TDM pattern, it may therefore be unavailable for the target base station. FIG. 9 displays this concept during synchronous transmissions, as the UE may transmit to the source base station at different times than the target base station. In FIG. 9, this is displayed by the white coloring of some blocks, in which transmission is allowed, and the diagonal line pattern in other blocks, in which transmission is not allowed.

As further shown in FIG. 9, the bottom two transmissions display that the source and target uplink transmissions can be asynchronous. The source and target downlink transmissions can also be asynchronous. As indicated above, based on the timing offset, the UE may not be able to use some of the transmission subframe opportunities on the uplink or the downlink. As further indicated above, the UE may transmit to the source base station at different times than the target base station based on the asynchronous pattern. This is also indicated by the coloring or line pattern of the blocks, wherein a white coloring can indicate that transmission is allowed and a diagonal line pattern can indicate that transmission is not allowed. As mentioned above, in some aspects, a portion of the subframe may be restricted or not allowed to be transmitted. For example, the entire subframe may not be restricted from transmission. Additionally, during asynchronous transmissions, the UE may not be allowed to send uplink or downlink data if an allowed frame/subframe/slot/symbol allocated for the source or target base station overlaps with a frame/subframe/slot/symbol allocated for the target or source base station. FIG. 9 displays that in some examples blocks with an "X" may not be allowed to transmit data. In some aspects, if an allowed frame/subframe/slot/symbol overlaps with another allowed frame/subframe/slot/symbol, then the subsequent overlapping frame/subframe/slot/symbol may not be allowed to transmit data, based on the pattern. This disallowing of previously allowed frames/subframes/slots/symbols may be applicable to either source or target base station transmissions.

Figure 10:
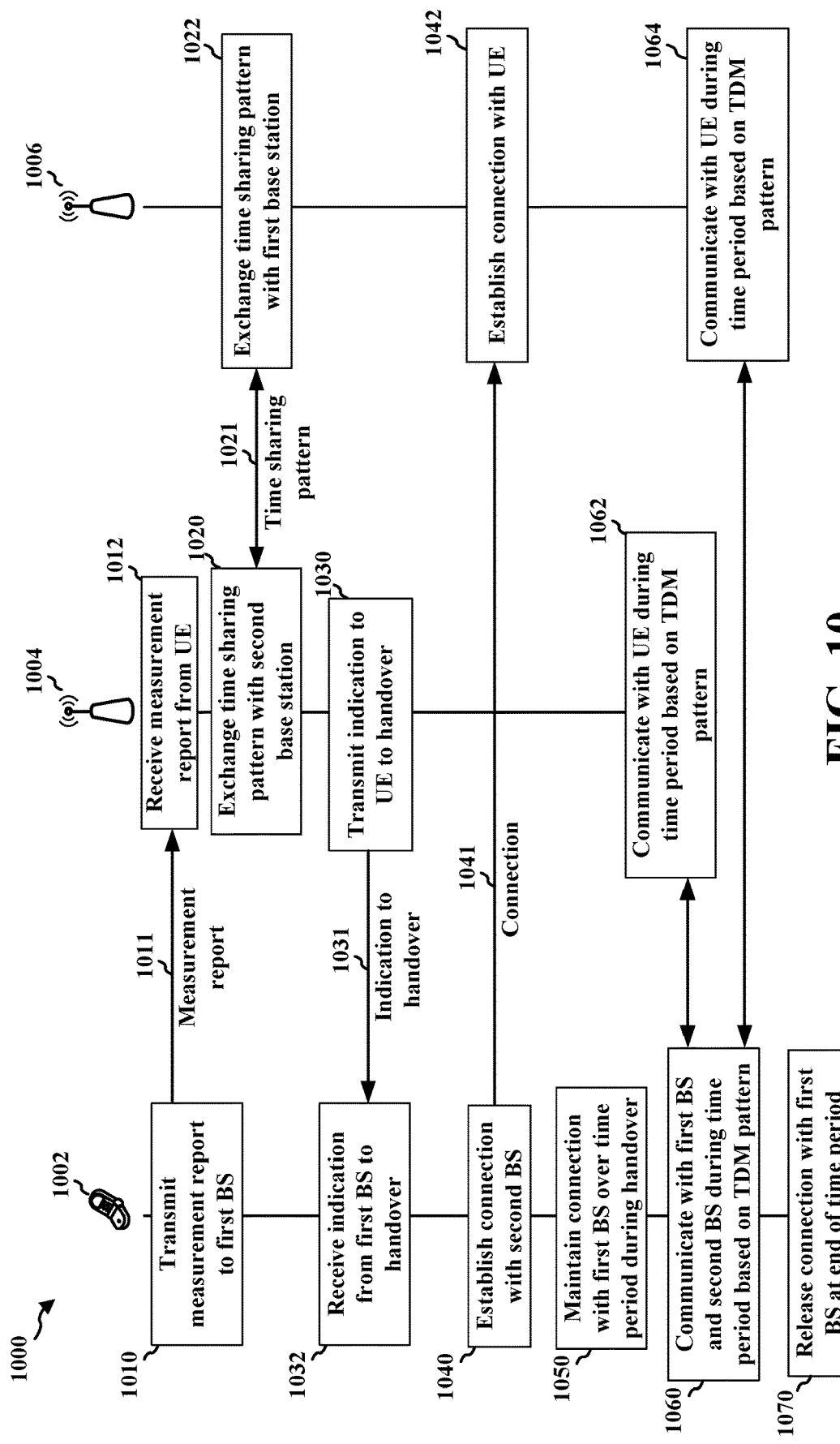
FIG. 10 is a diagram illustrating transmissions between a UE and first and second base stations.

FIG. 10 is a diagram 1000 illustrating transmissions between a UE (e.g., UE 1002), a first base station (e.g., first base station 1004) and a second base station (e.g., second base station 1006). For example, UE 1002 can transmit 1010 a measurement report 1011 to first base station 1004, as described in connection with FIG. 8. In turn, first base station 1004 can receive 1012 measurement report 1011 from UE 1002. At 1020, first base station 1004 can exchange a time sharing pattern 1021 with second base station 1006, as indicated in FIG. 8. Also, at 1022, second base station 1006 can exchange a time sharing pattern 1021 with first base station 1004. The time sharing pattern can be exchanged in a handover signaling between the first base station and the second base station. The time sharing pattern can also be based on whether the first base station is synchronous with the second base station. At 1030, first base station 1004 can transmit indication 1031 to UE 1002 to handover from the first base station to the second base station, as described in connection with FIG. 8. Likewise, at 1032, UE 1002 can receive indication 1031 from first base station 1004 to handover from the first base station to the second base station. The indication can further indicate the time sharing pattern for TDM communication with the first base station and the second base station over a period of time during the handover from the first base station to the second base station. The indication 1031 to handover to the second base station can also be received by the UE in a RRC connection reconfiguration message from the first base station, as indicated in connected with FIG. 8. The RRC connection reconfiguration message can also comprise an indication of a TDM pattern.

At 1040, UE 1002 may establish a connection 1041 with second base station 1006, as described in connection with FIG. 8. When the UE establishes a connection with the second base station, it can establish a timing synchronization with the second base station. Moreover, when the UE establishes a connection with the second base station, it can communicate with the second base station over a RACH. At 1050, UE 1002 can maintain a connection with first base station 1004 over a time period during the handover, as described in connection with FIG. 8. The time period can begin when the UE receives an RRC connection reconfiguration message from the first base station. The time period can end when the UE receives a message to release the first base station or when the UE releases the first base station.

At 1060, UE 1002 can communicate with first base station 1004 and second base station 1006 during the time period based on a TDM pattern, as indicated in FIG. 8. Likewise, at 1062 and 1064 respectively, first base station 1004 and second base station 1006 can communicate with UE 1002 during the time period based on the TDM pattern. The TDM pattern can be based on the time sharing pattern exchanged between the first base station and the second base station. When the UE communicates with the first base station during the time period, it can transmit uplink data to the first base station or receive downlink data from the first base station. When the UE communicates with the second base station during the time period, it can transmit uplink data to the second base station or receive downlink data from the second base station.

The TDM pattern can be based on a pattern received from the first base station. Additionally, the TDM pattern can comprise a pattern of subframes having a first set of subframes for transmitting to the first base station and a second set of subframes for transmitting to the second base station. The pattern of subframes may indicate subframes in one or more radio frames. Also, the TDM pattern can comprise a pattern of radio frames having a first set of radio frames for transmitting to the first base station and a second set of radio frames for transmitting to the second base station. Further, the TDM pattern can comprise a pattern of subframes having a first set of subframes for receiving from the first base station and a second set of subframes for receiving from the second base station. The TDM pattern can also comprise a pattern of radio frames having a first set of radio frames for receiving from the first base station and a second set of radio frames for receiving from the second base station. The TDM pattern can also be based on whether the first set of subframes is synchronous with the second set of subframes, as indicated in FIG. 9. The UE can also communicate with the first base station and the second base station on the first set of subframes or the second set of subframes. As described in connection with FIG. 9, the TDM pattern can also be based on whether the first set of subframes is asynchronous with the second set of subframes.

In some aspects, the UE can also indicate a UE capability to the first base station and the second base station, wherein the UE capability can comprise a single transmission or the TDM pattern. Further, the first base station and the second base station can allocate the TDM pattern during the handover based on the UE capability. Finally, at 1070, UE 1002 can release the connection with first base station 1004 at end of the time period, as described in connection with FIG. 8.

Figure 11:
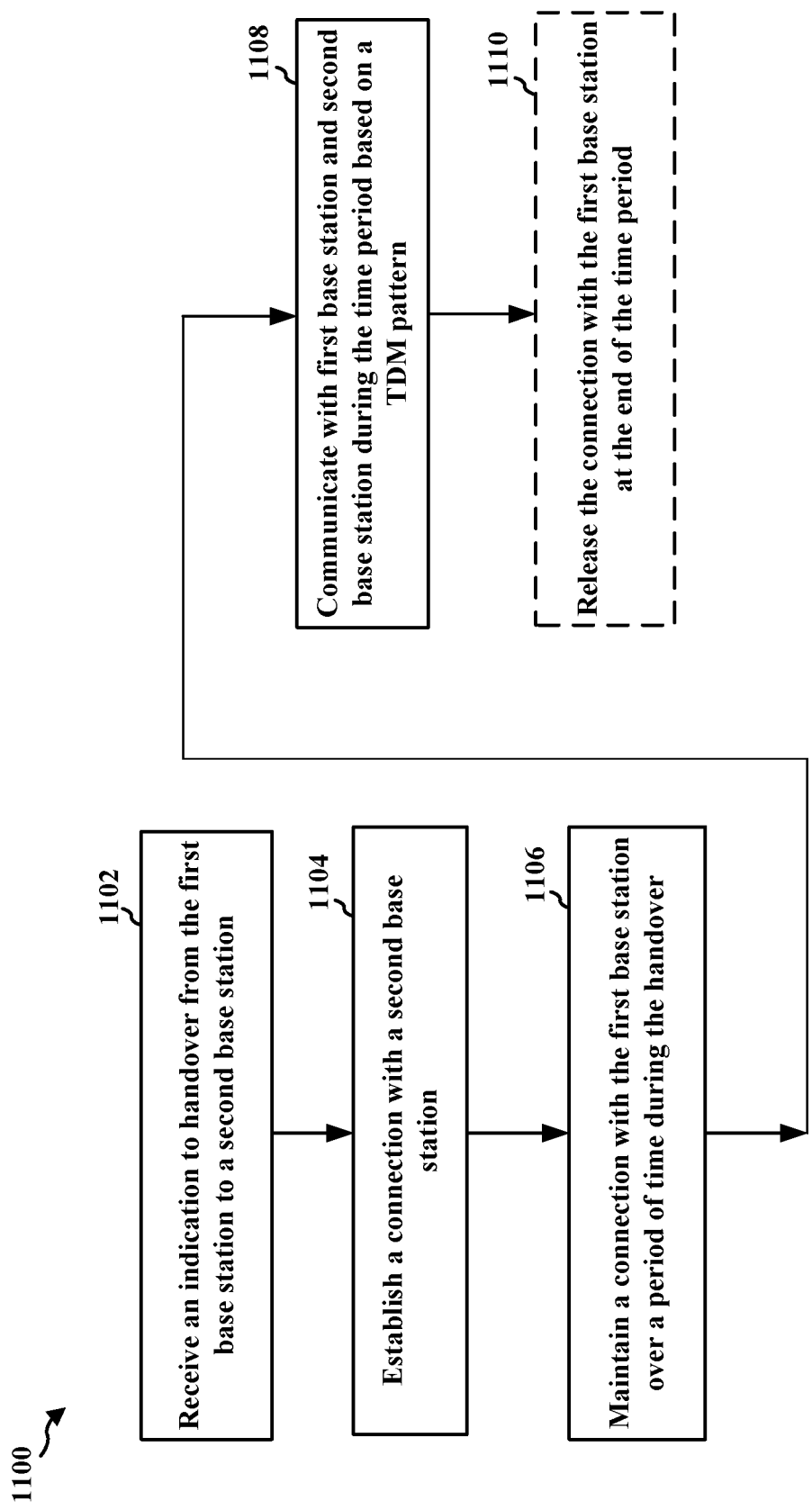
FIG. 11 is a flowchart of a method of wireless communication.

FIG. 11 is a flowchart 1100 of a method of wireless communication. The method may be performed by a UE or a component of a UE (e.g., UE 104, 350, 1002, apparatus 1202; processing system 1314, which may include the memory 360 and which may be the entire UE or a component of the UE, such as the TX processor 368, the RX processor 356, and/or the controller/processor 359) communicating with one or more base stations (e.g., base station 180, 181, 1004, 1006, apparatus 1502, apparatus 1802). Optional aspects are illustrated with a dashed line. The methods described herein can provide a number of benefits, such as improving communication signaling, resource utilization, and/or power savings. As mentioned in connection with the example of FIG. 8, the UE can transmit a measurement report to a first base station.

At 1102, the UE can receive an indication from the first base station to handover from the first base station to the second base station, as described in connection with FIG. 8. For example, reception component 1204 of apparatus 1202 may receive an indication from the first base station to handover from the first base station to the second base station. The indication can further indicate the time sharing pattern for TDM communication with the first base station and the second base station over a period of time during the handover from the first base station to the second base station. The indication to handover to the second base station can also be received by the UE in a RRC connection reconfiguration message from the first base station, as indicated in connected with FIG. 8. The RRC connection reconfiguration message can also comprise an indication of a TDM pattern.

At 1104, the UE may establish a connection with the second base station, as described in connection with FIG. 8. For example, connection establishment component 1206 of apparatus 1202 may establish a connection with the second base station. When the UE establishes a connection with the second base station, it can establish a timing synchronization with the second base station. Moreover, when the UE establishes a connection with the second base station, it can communicate with the second base station over a RACH. At 1106, the UE can maintain a connection with the first base station over a time period during the handover, as described in connection with FIG. 8. For example, connection maintenance component 1208 of apparatus 1202 may maintain a connection with the first base station over a time period during the handover. The time period can begin when the UE receives an RRC connection reconfiguration message from the first base station. The time period can end when the UE receives a message to release the first base station or when the UE releases the first base station.

At 1108, the UE can communicate with the first base station and the second base station during the time period based on a TDM pattern, as indicated in FIG. 8. For example, communication component 1210 of apparatus 1202 may communicate with the first base station and the second base station during the time period based on a TDM pattern. The TDM pattern can be based on the time sharing pattern exchanged between the first base station and the second base station. When the UE communicates with the first base station during the time period, it can transmit uplink data to the first base station and/or receive downlink data from the first base station. When the UE communicates with the second base station during the time period, it can transmit uplink data to the second base station and/or receive downlink data from the second base station. The TDM pattern can be based on a pattern received from the first base station. Additionally, the TDM pattern can comprise a pattern of subframes having a first set of subframes for transmitting to the first base station and a second set of subframes for transmitting to the second base station. The pattern of subframes may indicate subframes in one or more radio frames. Also, the TDM pattern can comprise a pattern of radio frames having a first set of radio frames for transmitting to the first base station and a second set of radio frames for transmitting to the second base station. Further, the TDM pattern can comprise a pattern of subframes having a first set of subframes for receiving from the first base station and a second set of subframes for receiving from the second base station. The TDM pattern can also comprise a pattern of radio frames having a first set of radio frames for receiving from the first base station and a second set of radio frames for receiving from the second base station. The TDM pattern can also be based on whether the first set of subframes is synchronous with the second set of subframes, as indicated in FIG. 9. The UE can also communicate with the first base station and the second base station on the first set of subframes or the second set of subframes. As described in connection with FIG. 9, the TDM pattern can also be based on whether the first set of subframes is asynchronous with the second set of subframes. In some aspects, the UE can also indicate a UE capability to the first base station and the second base station, wherein the UE capability can comprise a single transmission or the TDM pattern. Further, the first base station and the second base station can allocate the TDM pattern during the handover based on the UE capability.

Finally, at 1110, the UE can release the connection with the first base station at the end of the time period, as described in connection with FIG. 8. For example, connection release component 1212 of apparatus 1202 may release the connection with the first base station at the end of the time period.

Figure 12:
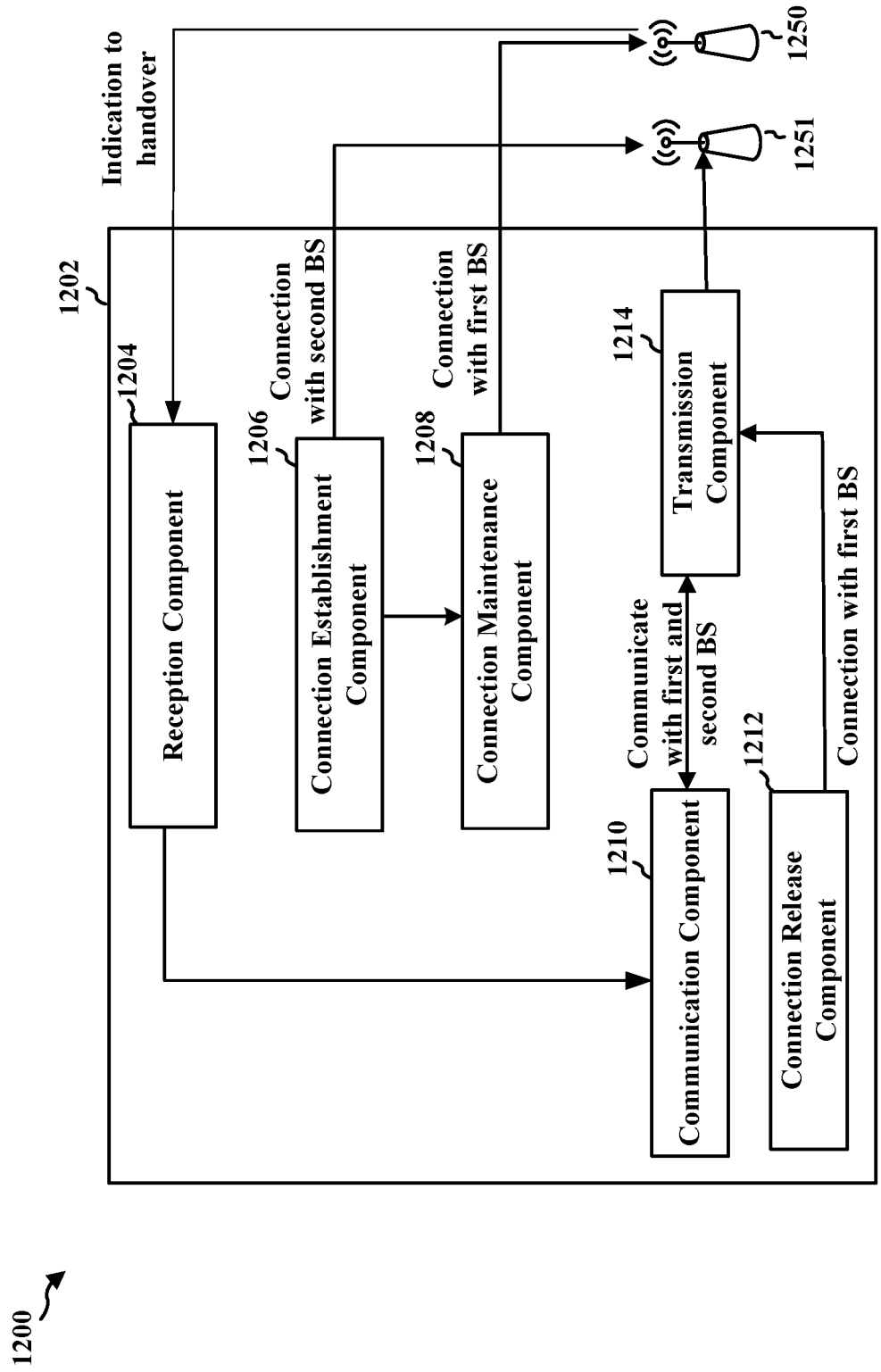
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE or a component of a UE. The apparatus includes a reception component 1204 that is configured to receive an indication to handover from a first base station 1250 to a second base station 1251, e.g., as described in connection with step 1102 above. The apparatus also includes connection establishment component 1206 that is configured to establish a connection with the second base station 1251, e.g., as described in connection with step 1104 above. Additionally, the apparatus includes a connection maintenance component 1208 that is configured to maintain a connection with the first base station 1250 over a period of time during the handover, e.g., as described in connection with step 1106 above. Further, the apparatus includes a communication component 1210 that is configured to communicate with the first base station 1250 and the second base station 1251 during the time period based on a TDM pattern, e.g., via transmission component 1214, as described in connection with step 1108 above. The apparatus also includes a connection release component 1212 that is configured to release the connection with the first base station at the end of the time period, e.g., as described in connection with step 1110 above.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
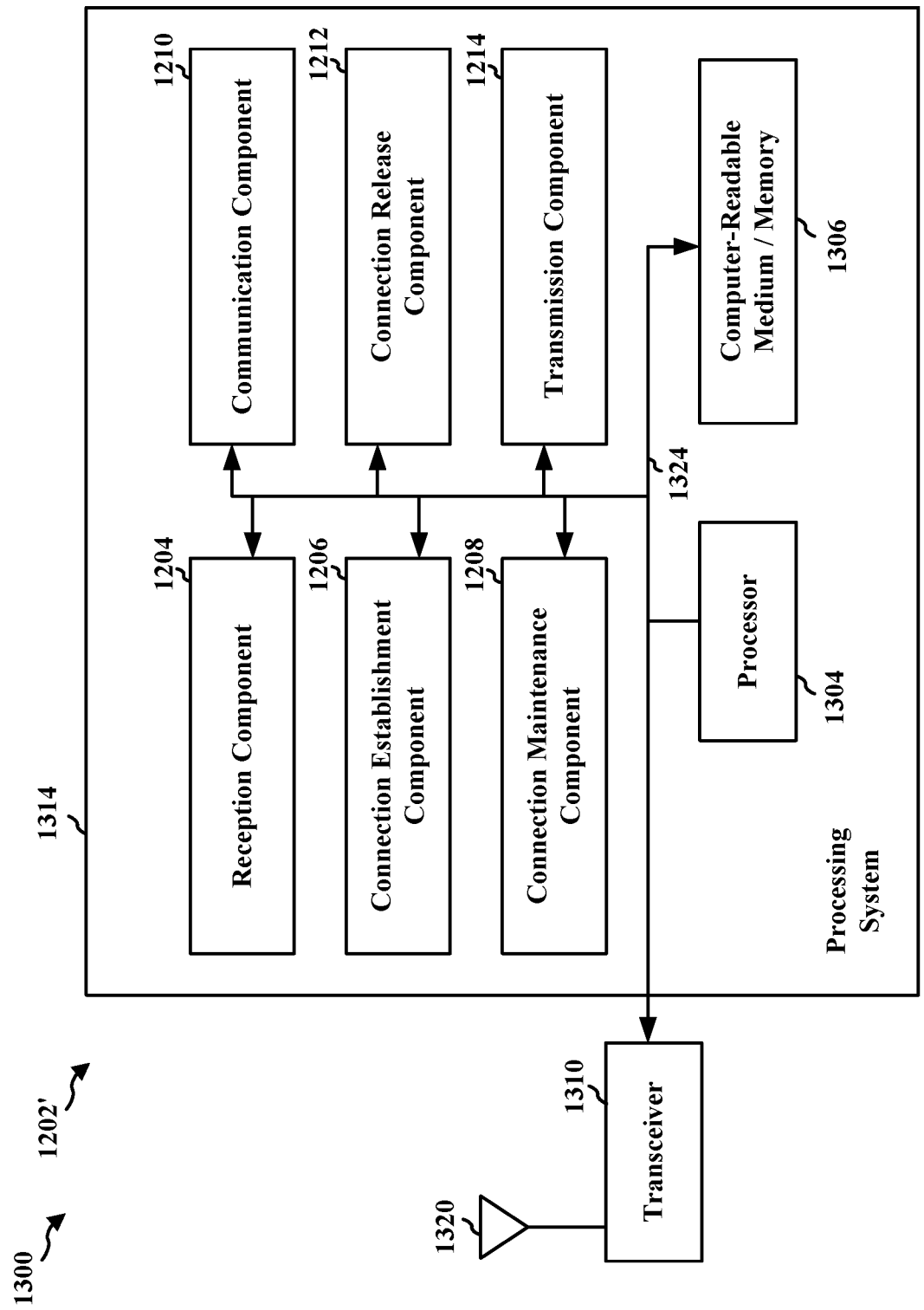
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1214, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may comprise the entire UE 350.

In one configuration, the apparatus 1202/1202' for wireless communication includes means for means for receiving an indication, from a first base station serving the UE, to handover from the first base station to a second base station. The apparatus 1202/1202' can further include means for establishing a connection with a second base station. The apparatus 1202/1202' can also include means for maintaining a connection with the first base station over a period of time during the handover. The apparatus 1202/1202' can further include means for communicating with the first base station and the second base station during the period of time based on a time division multiplexing (TDM) pattern. The apparatus 1202/1202' can further include means for releasing the connection with the first base station at the end of the period of time. The means for communicating with the first base station during the period of time can be configured to transmit first uplink data to the first base station or receive first downlink data from the first base station. The means for communicating with the second base station during the period of time can be configured to transmit second uplink data to the second base station or receive second downlink data from the second base station. The means for establishing a connection with the second base station can be configured to establish a timing synchronization with the second base station. The means for establishing a connection with the second base station can be configured to communicate with the second base station over a random access channel (RACH). The apparatus 1202/1202' can further include means for indicating a UE capability to the first base station and the second base station, wherein the UE capability comprises a single transmission and the TDM pattern. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
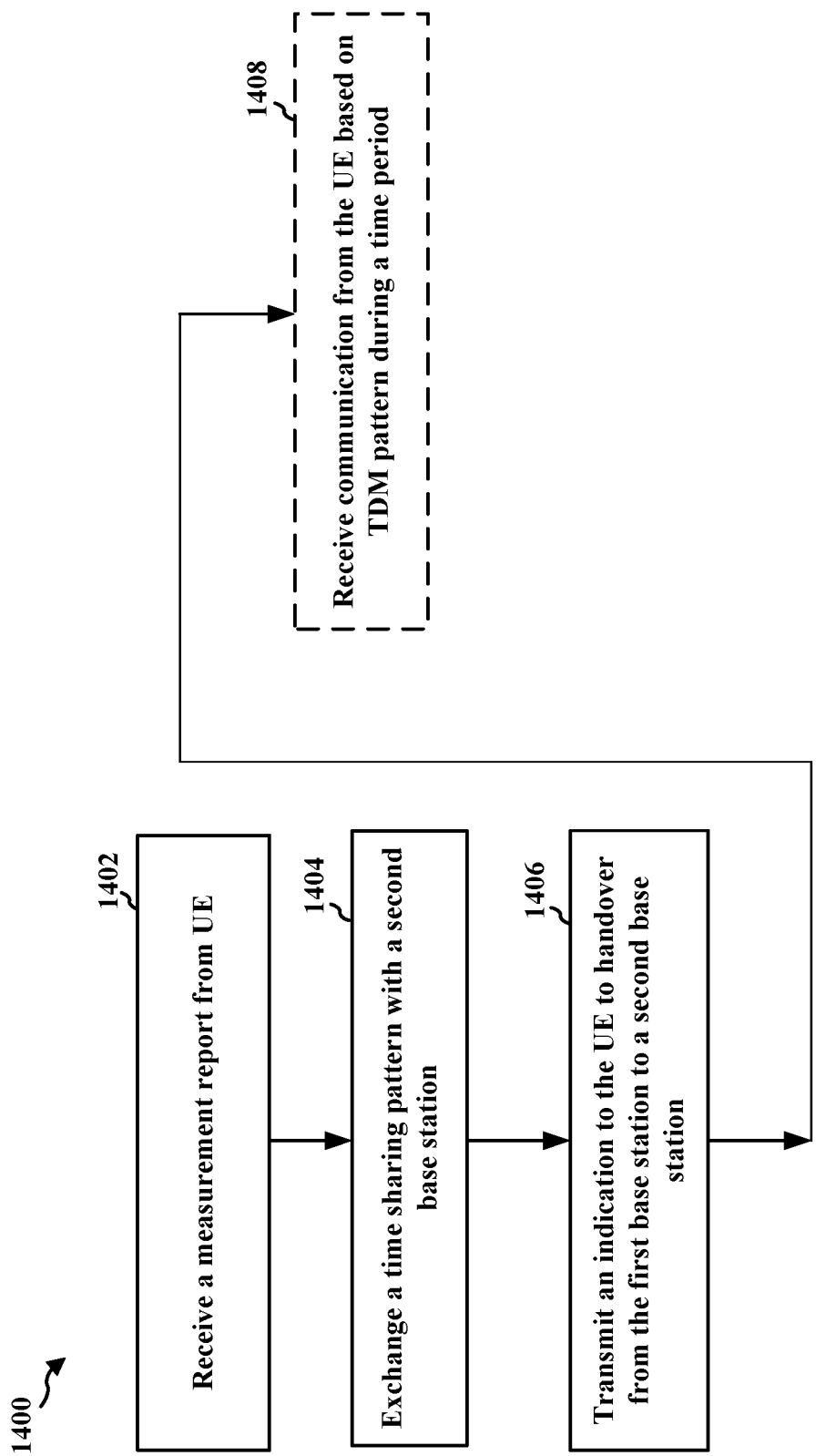
FIG. 14 is a flowchart of a method of wireless communication.

FIG. 14 is a flowchart 1400 of a method of wireless communication. The method may be performed by a first base station or a component of a base station (e.g., base station 180, 1004, apparatus 1502, apparatus 1802; processing system 1614, which may include the memory 376 and which may be the entire base station or a component of the base station, such as the TX processor 316, the RX processor 370, and/or the controller/processor 375) communicating with a UE (e.g., UE 104, 350, 1002, apparatus 1202) and a second base station (e.g., base station 181, 1006, apparatus 1502, apparatus 1802). Optional aspects are illustrated with a dashed line. The methods described herein can provide a number of benefits, such as improving communication signaling, resource utilization, and/or power savings.

At 1402, the first base station can receive a measurement report from the UE, as mentioned in connection with the example of FIG. 8. For example, reception component 1504 of apparatus 1502 may receive a measurement report from the UE. At 1404, the first base station can exchange a time sharing pattern with the second base station, as indicated in FIG. 8. For example, exchange component 1508 of apparatus 1502 may exchange a time sharing pattern with the second base station. The time sharing pattern can be exchanged in a handover signaling between the first base station and the second base station. The time sharing pattern can also be based on whether the first base station is synchronous with the second base station.

At 1406, the first base station can transmit an indication to the UE to handover from the first base station to the second base station, as described in connection with FIG. 8. For example, transmission component 1514 of apparatus 1502 may transmit an indication to the UE to handover from the first base station to the second base station. The indication can further indicate the time sharing pattern for TDM communication with the first base station and the second base station over a period of time during the handover from the first base station to the second base station. The indication to handover to the second base station can also be received by the UE in a RRC connection reconfiguration message from the first base station, as indicated in connected with FIG. 8. The RRC connection reconfiguration message can also comprise an indication of a TDM pattern.

The UE can maintain a connection with the first base station over a time period during the handover, as described in connection with FIG. 8. The time period can begin when the UE receives an RRC connection reconfiguration message from the first base station. The time period can end when the UE receives a message to release the first base station or when the UE releases the first base station.

At 1408, the first base station can receive a communication from the UE based on TDM pattern during a time period, as indicated in FIG. 8. For example, reception component 1504 of apparatus 1502 may receive a communication from the UE based on TDM pattern during a time period. The TDM pattern can be based on the time sharing pattern exchanged between the first base station and the second base station. When the first base station communicates with the UE during the time period, it can transmit downlink data to the UE or receive uplink data from the UE. The TDM pattern can be based on a pattern transmitted by the first base station. Additionally, the TDM pattern can comprise a pattern of subframes having a first set of subframes for transmitting to the first base station and a second set of subframes for transmitting to the second base station. The pattern of subframes may indicate subframes in one or more radio frames. Also, the TDM pattern can comprise a pattern of radio frames having a first set of radio frames for transmitting to the first base station and a second set of radio frames for transmitting to the second base station. Further, the TDM pattern can comprise a pattern of subframes having a first set of subframes for receiving from the first base station and a second set of subframes for receiving from the second base station. The TDM pattern can also comprise a pattern of radio frames having a first set of radio frames for receiving from the first base station and a second set of radio frames for receiving from the second base station. The TDM pattern can also be based on whether the first set of subframes is synchronous with the second set of subframes, as indicated in FIG. 9. The UE can also communicate with the first base station and the second base station on the first set of subframes or the second set of subframes. As described in connection with FIG. 9, the TDM pattern can also be based on whether the first set of subframes is asynchronous with the second set of subframes.

In some aspects, the UE can also indicate a UE capability to the first base station and the second base station, wherein the UE capability can comprise a single transmission or the TDM pattern. Further, the first base station and the second base station can allocate the TDM pattern during the handover based on the UE capability. Finally, the UE can release the connection with the first base station at end of the time period, as described in connection with FIG. 8.

Figure 15:
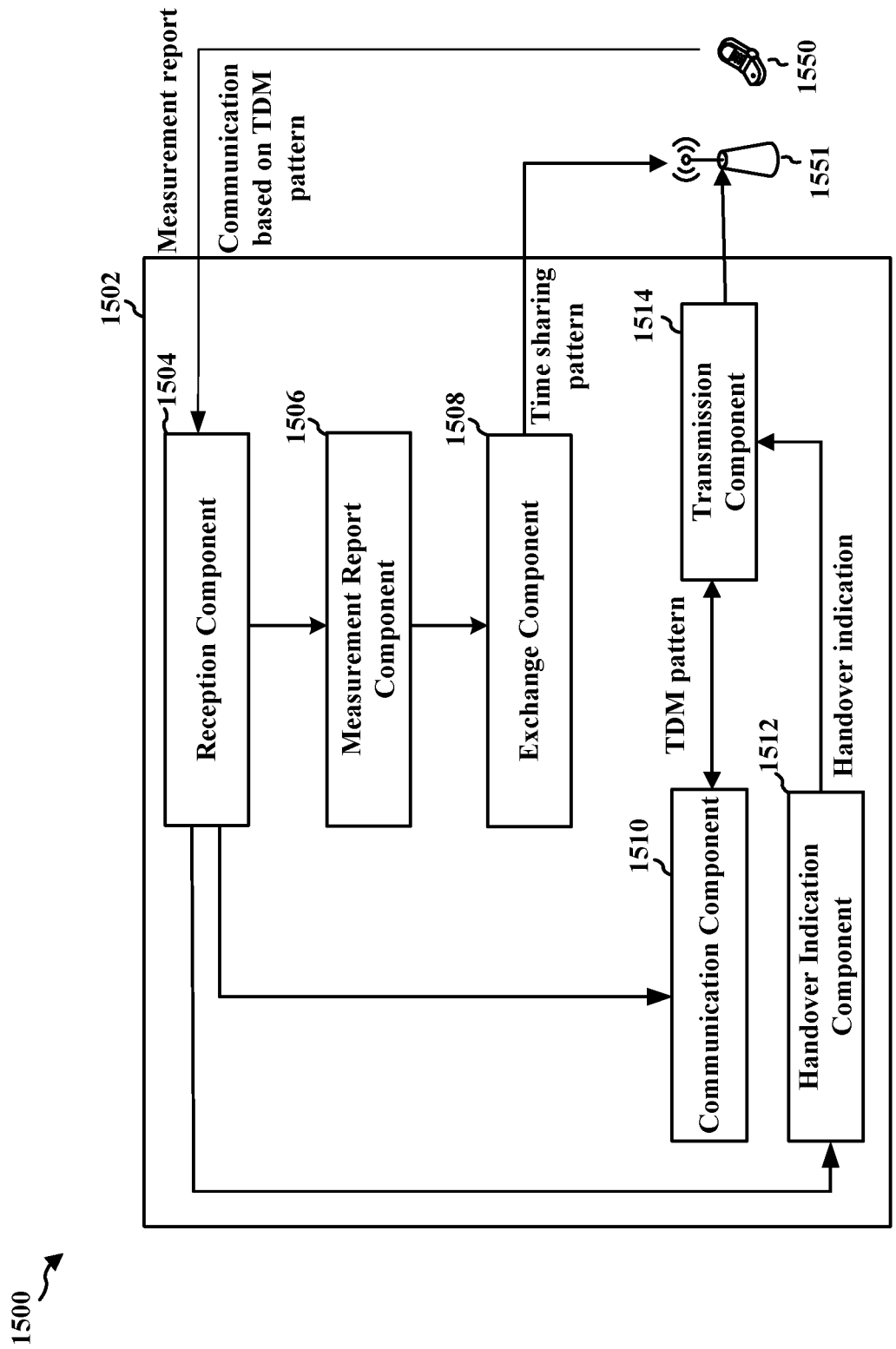
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a base station or a component of a base station. The apparatus includes a measurement report component 1506 that is configured to receive a measurement report from a UE, e.g., via reception component 1504, as described in connection with step 1402 above. The apparatus also includes an exchange component 1508 that is configured to exchange a time sharing pattern with a second base station, e.g., as described in connection with step 1404 above. The apparatus further includes a communication component that is configured to receive communication from the UE based on TDM pattern during a time period, e.g., via reception component 1504, as described in connection with step 1408 above. Further, the apparatus includes a handover indication component 1512 that is configured to transmit an indication to the UE to handover from the first base station to a second base station, e.g., via transmission component 1514, as described in connection with step 1406 above.

The apparatus may include additional components that perform each of the blocks of the algorithm in the aforementioned flowcharts of FIGS. 10 and 14. As such, each block in the aforementioned flowcharts of FIGS. 10 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
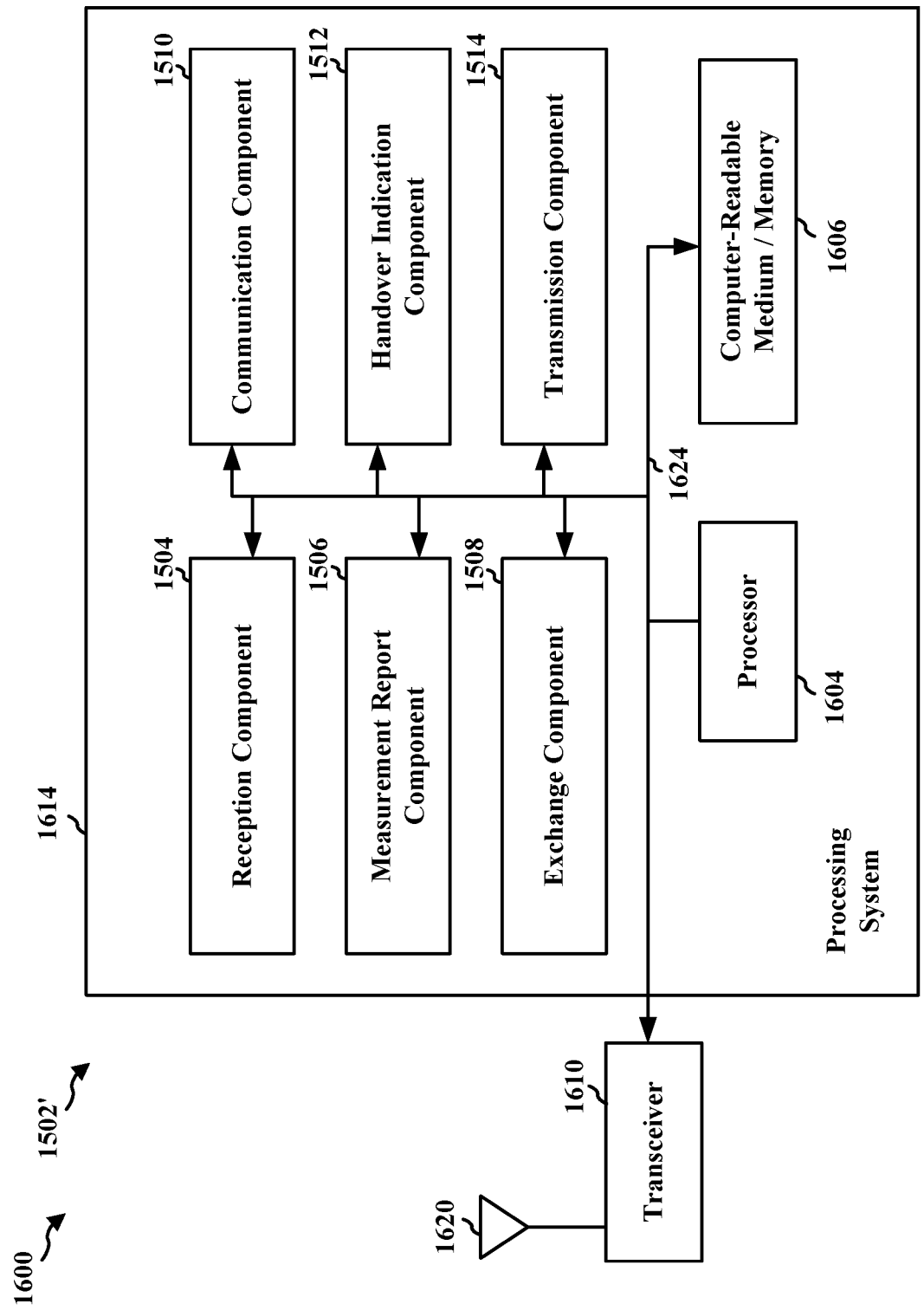
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1514, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375. Alternatively, the processing system may comprise the entire base station, e.g., base station 310.

In one configuration, the apparatus 1502/1502' for wireless communication includes means for receiving a measurement report from the UE. The apparatus further includes means for exchanging a time sharing pattern with a second base station. The apparatus can further include means for transmitting an indication to the UE to handover from the first base station to a second base station. The apparatus further includes means for receiving communication from the UE based on a TDM pattern during the period of time. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
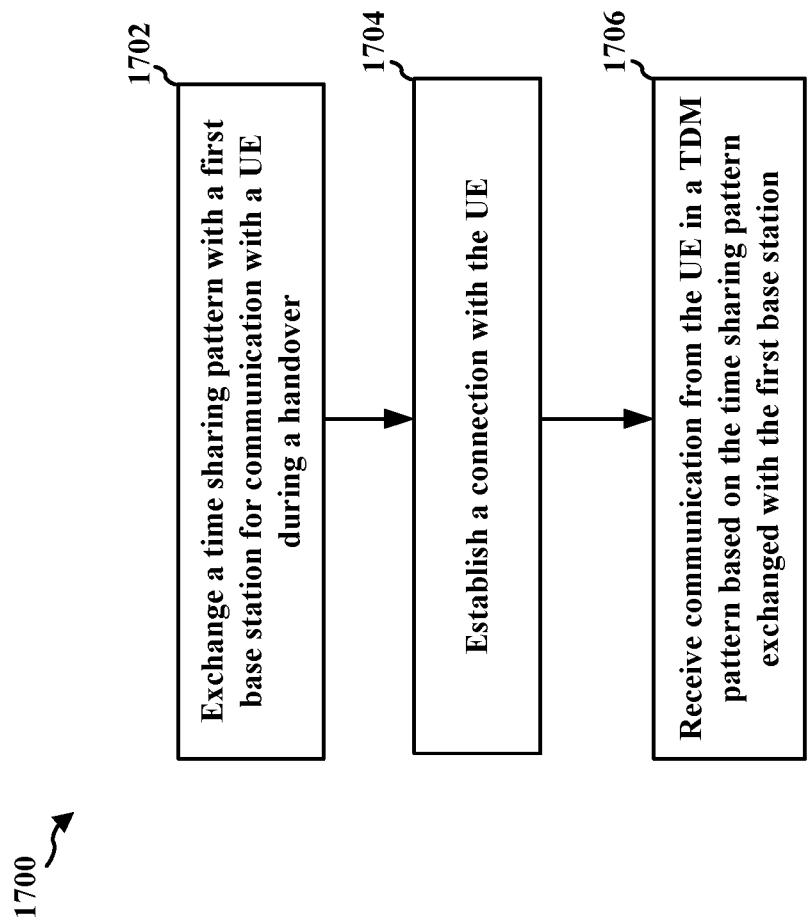
FIG. 17 is a flowchart of a method of wireless communication.

FIG. 17 is a flowchart 1700 of a method of wireless communication. The method may be performed by a second base station or a component of a second base station (e.g., base station 181, 1006, apparatus 1502, apparatus 1802; processing system 1914, which may include the memory 376 and which may be the entire base station or a component of the base station, such as the TX processor 316, the RX processor 370, and/or the controller/processor 375) communicating with a UE (e.g., UE 104, 350, 1002, apparatus 1202) and a first base station (e.g., base station 180, 1004, apparatus 1502, apparatus 1802). Optional aspects are illustrated with a dashed line. The methods described herein can provide a number of benefits, such as improving communication signaling, resource utilization, and/or power savings.

At 1702, the second base station can exchange a time sharing pattern with a first base station for communication with a UE during a handover, as indicated in FIG. 8. For example, exchange component 1806 of apparatus 1802 may exchange a time sharing pattern with a first base station for communication with a UE during a handover. The time sharing pattern can be exchanged in a handover signaling between the first base station and the second base station. The time sharing pattern can also be based on whether the first base station is synchronous with the second base station.

At 1704, the second base station may establish a connection with the UE, as described in connection with FIG. 8. For example, connection component 1808 of apparatus 1802 may establish a connection with the UE. When the second base station establishes a connection with the UE, it can establish a timing synchronization with the UE. Moreover, the second base station establishes a connection with the UE, it can communicate with the UE over a RACH.

At 1706, the second base station can receive communication from the UE in a TDM pattern based on the time sharing pattern exchanged with the first base station, as indicated in FIG. 8. For example, reception component 1804 of apparatus 1802 may receive communication from the UE in a TDM pattern based on the time sharing pattern exchanged with the first base station. When the second base station communicates with the UE during a time period, it can transmit downlink data to the UE or receive uplink data from the UE. The TDM pattern can be based on a pattern received from the first base station. Additionally, the TDM pattern can comprise a pattern of subframes having a first set of subframes for transmitting to the first base station and a second set of subframes for transmitting to the second base station. The pattern of subframes may indicate subframes in one or more radio frames. Also, the TDM pattern can comprise a pattern of radio frames having a first set of radio frames for transmitting to the first base station and a second set of radio frames for transmitting to the second base station. Further, the TDM pattern can comprise a pattern of subframes having a first set of subframes for receiving from the first base station and a second set of subframes for receiving from the second base station. The TDM pattern can also comprise a pattern of radio frames having a first set of radio frames for receiving from the first base station and a second set of radio frames for receiving from the second base station. The TDM pattern can also be based on whether the first set of subframes is synchronous with the second set of subframes, as indicated in FIG. 9. The second base station can also communicate with the UE on the first set of subframes or the second set of subframes. As described in connection with FIG. 9, the TDM pattern can also be based on whether the first set of subframes is asynchronous with the second set of subframes.

In some aspects, the UE can also indicate a UE capability to the second base station, wherein the UE capability can comprise a single transmission or the TDM pattern. Further, the second base station can allocate the TDM pattern during the handover based on the UE capability.

Figure 18:
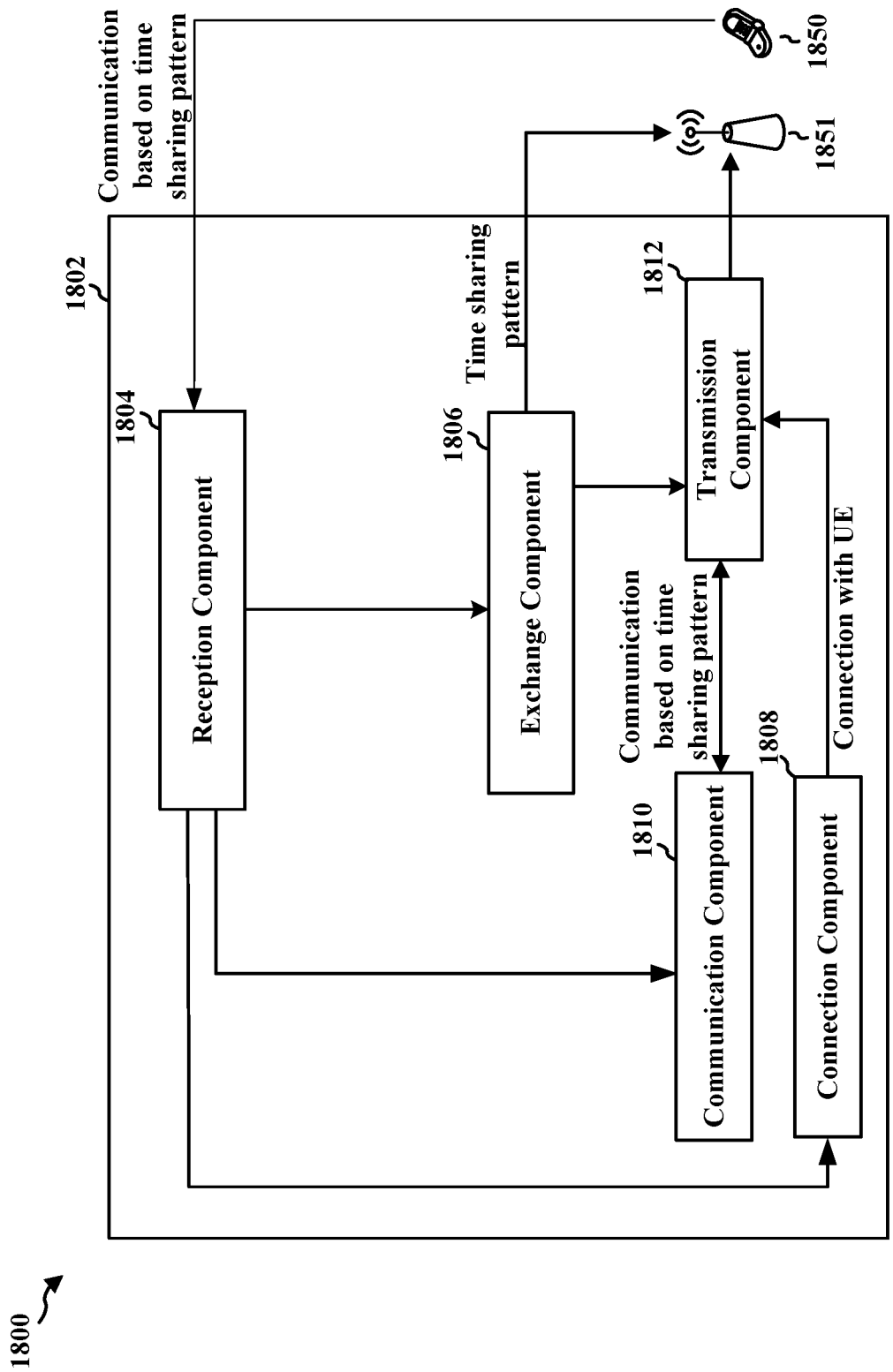
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a base station or a component of a base station. The apparatus includes an exchange component 1806 that is configured to exchange a time sharing pattern with a first base station for communication with a UE during a handover, e.g., via reception component 1804 and transmission component 1812, as described in connection with step 1702 above. The apparatus further includes a connection component 1808 that is configured to establish a connection with the UE, e.g., via reception component 1804 and transmission component 1812, as described in connection with step 1704 above. The apparatus further includes a communication component 1810 that is configured to receive communication from the UE in a TDM pattern based on the time sharing pattern exchanged with the first base station, e.g., via reception component 1804 and transmission component 1812, as described in connection with step 1706 above.

The apparatus may include additional components that perform each of the blocks of the algorithm in the aforementioned flowcharts of FIGS. 10 and 17. As such, each block in the aforementioned flowcharts of FIGS. 10 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
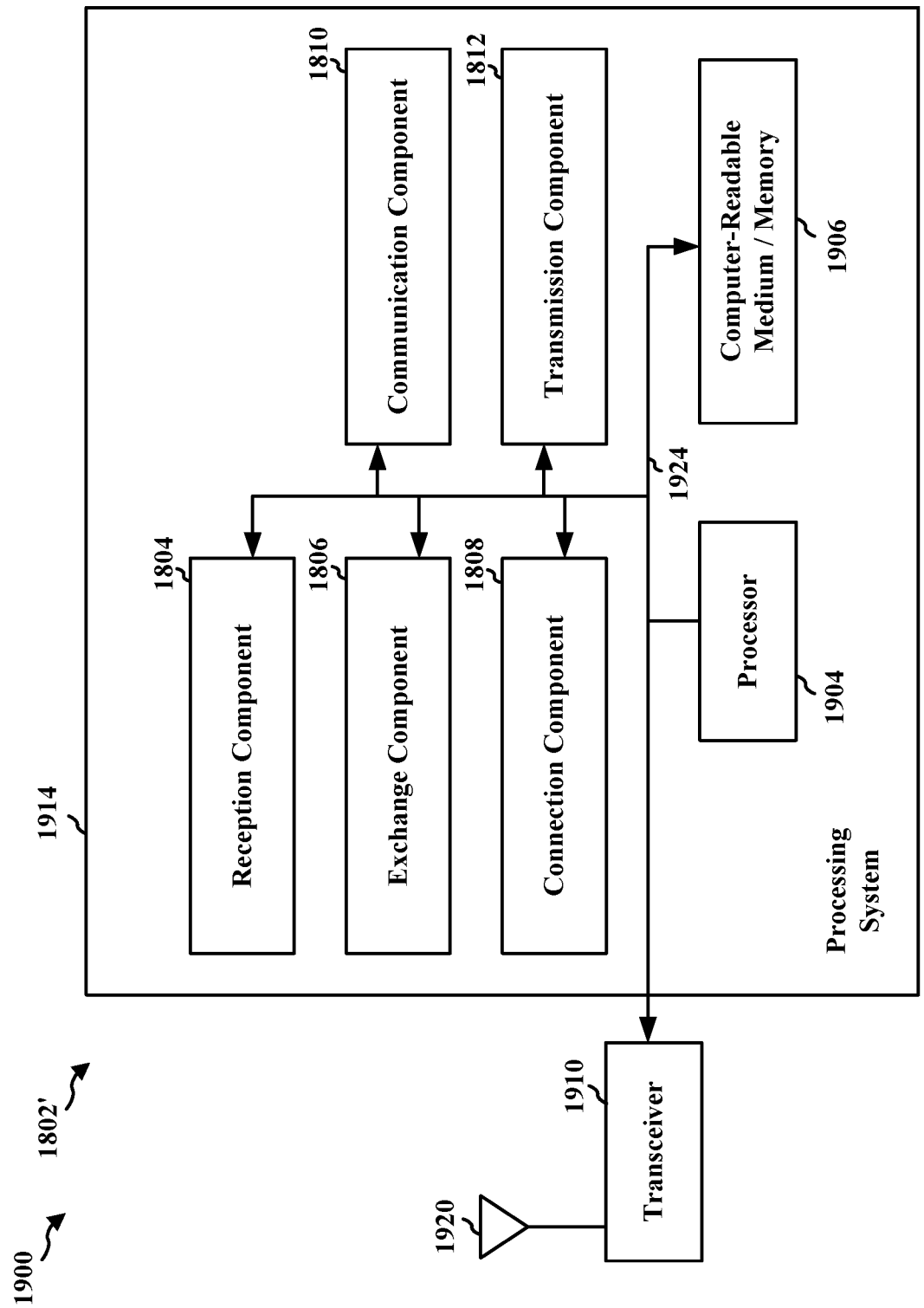
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1812, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375. Alternatively, the processing system 1914 may comprise the entire base station, e.g., base station 310.

In one configuration, the apparatus 1802/1802' for wireless communication includes means for exchanging a time sharing pattern with a first base station for communication with a UE during a handover. The apparatus further includes means for establishing a connection with the UE. The apparatus also includes means for receiving communication from the UE in a TDM pattern based on the time sharing pattern exchanged with the first base station. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Any of the aspects in the following examples may be combined with any of the aspects of the previous discussions and/or embodiments described herein.

Example 1 is a method of wireless communication at a UE, comprising receiving an indication, from a first base station serving the UE, to handover from the first base station to a second base station, establishing a connection with the second base station, maintaining a connection with the first base station over a period of time during the handover, and communicating with the first base station and the second base station during the period of time based on a TDM pattern.

In Example 2, the method of example 1 further includes releasing the connection with the first base station at an end of the period of time.

In Example 3, the method of any of examples 1-2 further includes that the TDM pattern is based on a pattern received from the first base station.

In Example 4, the method of any of examples 1-3 further includes that the indication to handover to the second base station is received in a radio resource control (RRC) connection reconfiguration message from the first base station, wherein the RRC connection reconfiguration message comprises an indication of the TDM pattern.

In Example 5, the method of any of examples 1-4 further includes that the period of time begins when the UE receives the RRC connection reconfiguration message.

In Example 6, the method of any of examples 1-5 further includes that the period of time ends when the UE receives a message to release the first base station or when the UE releases the first base station.

In Example 7, the method of any of examples 1-6 further includes that communicating with the first base station during the period of time comprises at least one of transmitting first uplink data to the first base station or receiving first downlink data from the first base station, and wherein communicating with the second base station during the period of time comprises at least one of transmitting second uplink data to the second base station or receiving second downlink data from the second base station.

In Example 8, the method of any of examples 1-7 further includes that establishing the connection with the second base station comprises establishing a timing synchronization with the second base station.

In Example 9, the method of any of examples 1-8 further includes that establishing the connection with the second base station comprises communicating with the second base station over a RACH.

In Example 10, the method of any of examples 1-9 further includes that the TDM pattern comprises a pattern of subframes having a first set of subframes for transmitting to the first base station and a second set of subframes for transmitting to the second base station.

In Example 11, the method of any of examples 1-10 further includes that the pattern of subframes indicates subframes in one or more radio frames.

In Example 12, the method of any of examples 1-11 further includes that the TDM pattern comprises a pattern of radio frames having a first set of radio frames for transmitting to the first base station and a second set of radio frames for transmitting to the second base station.

In Example 13, the method of any of examples 1-12 further includes that the TDM pattern is based on whether the first set of subframes is synchronous with the second set of subframes.

In Example 14, the method of any of examples 1-13 further includes that the UE communicates with the first base station and the second base station on the first set of subframes or the second set of subframes.

In Example 15, the method of any of examples 1-14 further includes that the TDM pattern is based on whether the first set of subframes is asynchronous with the second set of subframes.

In Example 16, the method of any of examples 1-15 further includes that the TDM pattern comprises a pattern of subframes having a first set of subframes for receiving from the first base station and a second set of subframes for receiving from the second base station.

In Example 17, the method of any of examples 1-16 further includes that the TDM pattern comprises a pattern of radio frames having a first set of radio frames for receiving from the first base station and a second set of radio frames for receiving from the second base station.

In Example 18, the method of any of examples 1-17 further includes indicating a UE capability to the first base station and the second base station, wherein the UE capability comprises a single transmission and the TDM pattern.

In Example 19, the method of any of examples 1-18 further includes that the first base station and the second base station allocate the TDM pattern during the handover based on the UE capability.

Example 20 is a system or apparatus including means for implementing a method or realizing an apparatus as in any of examples 1-19.

Example 21 is a device including one or more processors and memory in electronic communication with the one or more processors storing instructions executable by the one or more processors to cause the system or apparatus to implement a method as in any of examples 1-19.

Example 22 is a non-transitory computer readable medium storing instructions executable by one or more processors to cause the one or more processors to implement a method as in any of examples 1-19.

Example 23 is a method of wireless communication at first base station connected to a UE, comprising receiving a measurement report from the UE, exchanging a time sharing pattern with a second base station, and transmitting an indication to the UE to handover from the first base station to the second base station, wherein the indication further indicates the time sharing pattern for TDM communication with the first base station and the second base station over a period of time during the handover from the first base station to the second base station.

In Example 24, the method of example 23 further includes receiving communication from the UE based on the TDM pattern during the period of time.

In Example 25, the method of any of examples 23-24 further includes that the indication to handover to the second base station comprises a RRC connection reconfiguration message to the UE.

In Example 26, the method of any of examples 23-25 further includes that the period of time begins when the UE receives the RRC connection reconfiguration message.

In Example 27, the method of any of examples 23-26 further includes that the period of time ends when the first base station receives a context release message from the second base station or when the first base station receives a message from the UE indicating a handover failure.

In Example 28, the method of any of examples 23-27 further includes that the time sharing pattern comprises a pattern of subframes.

In Example 29, the method of any of examples 23-28 further includes that the time sharing pattern comprises a pattern of radio frames.

In Example 30, the method of any of examples 23-29 further includes that the pattern of subframes indicates subframes in one or more radio frames.

In Example 31, the method of any of examples 23-30 further includes that the time sharing pattern is based on whether the first base station is synchronous with the second base station.

Example 32 is a system or apparatus including means for implementing a method or realizing an apparatus as in any of examples 23-31.

Example 33 is a device including one or more processors and memory in electronic communication with the one or more processors storing instructions executable by the one or more processors to cause the system or apparatus to implement a method as in any of examples 23-31.

Example 34 is a non-transitory computer readable medium storing instructions executable by one or more processors to cause the one or more processors to implement a method as in any of examples 23-31.

Example 35 is a method of wireless communication at a second base station, comprising exchanging a time sharing pattern with a first base station for communication with a UE during a handover, establishing a connection with the UE, receiving communication from the UE in a TDM pattern based on the time sharing pattern exchanged with the first base station, wherein the communication is received over a period of time during a handover.

In Example 36, the method of example 35 further includes that the period of time begins when the UE receives the RRC connection reconfiguration message.

In Example 37, the method of any of examples 35-36 further includes that the period of time ends when the second base station transmits a context release message to the first base station.

In Example 38, the method of any of examples 35-37 wherein establishing the connection with the UE comprises further includes establishing a timing synchronization with the UE.

In Example 39, the method of any of examples 35-38 wherein establishing the connection with the UE further includes communicating with the UE over a RACH.

In Example 40, the method of any of examples 35-39 further includes that the time sharing pattern is exchanged with the first base station in handover signaling with the first base station.

In Example 41, the method of any of examples 35-40 further includes that the TDM pattern comprises a pattern of subframes.

In Example 42, the method of any of examples 35-41 further includes that the TDM pattern comprises a pattern of radio frames.

In Example 43, the method of any of examples 35-42 further includes that the pattern of subframes indicates subframes in one or more radio frames.

In Example 44, the method of any of examples 35-43 further includes that the time sharing pattern is based on whether the first base station is synchronous with the second base station.

Example 45 is a system or apparatus including means for implementing a method or realizing an apparatus as in any of examples 35-44.

Example 46 is a device including one or more processors and memory in electronic communication with the one or more processors storing instructions executable by the one or more processors to cause the system or apparatus to implement a method as in any of examples 35-44.

Example 47 is a non-transitory computer readable medium storing instructions executable by one or more processors to cause the one or more processors to implement a method as in any of examples 35-44.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving an indication, from a first base station serving the UE, to handover from the first base station to a second base station;
   establishing a connection with the second base station;
   maintaining a connection with the first base station over a period of time during the handover; and
   communicating with the first base station and the second base station during the period of time based on a time division multiplexing (TDM) pattern,
   wherein the TDM pattern comprises a pattern of subframes having a first set of subframes for transmitting to the first base station and a second set of subframes for transmitting to the second base station, and the TDM pattern is based on whether the first set of subframes is asynchronous with the second set of subframes.

2. The method of claim 1, further comprising:
   releasing the connection with the first base station at an end of the period of time.

3. The method of claim 1, wherein the TDM pattern is based on a pattern received from the first base station.

4. The method of claim 3, wherein the indication to handover to the second base station is received in a radio resource control (RRC) connection reconfiguration message from the first base station, wherein the RRC connection reconfiguration message comprises an indication of the TDM pattern.

5. The method of claim 4, wherein the period of time begins when the UE receives the RRC connection reconfiguration message.

6. The method of claim 5, wherein the period of time ends when the UE receives a message to release the first base station or when the UE releases the first base station.

7. The method of claim 6, wherein a medium access control (MAC) control element (MAC-CE) indicates at least one of the message to release the first base station or a release of the TDM pattern.

8. The method of claim 1, wherein communicating with the first base station during the period of time comprises at least one of transmitting first uplink data to the first base station or receiving first downlink data from the first base station, and wherein communicating with the second base station during the period of time comprises at least one of:
   transmitting second uplink data to the second base station; or
   receiving second downlink data from the second base station.

9. The method of claim 1, wherein establishing the connection with the second base station comprises:
   establishing a timing synchronization with the second base station.

10. The method of claim 1, wherein establishing the connection with the second base station comprises:
communicating with the second base station over a random access channel (RACH).

11. The method of claim 1, wherein the pattern of subframes indicates subframes in one or more radio frames.

12. The method of claim 1, wherein the TDM pattern comprises a pattern of radio frames having a first set of radio frames for transmitting to the first base station and a second set of radio frames for transmitting to the second base station.

13. The method of claim 1, wherein the TDM pattern is based on whether the first set of subframes is synchronous with the second set of subframes.

14. The method of claim 1, wherein the UE communicates with the first base station and the second base station on the first set of subframes or the second set of subframes.

15. The method of claim 1, wherein the TDM pattern comprises a pattern of subframes having a first set of subframes for receiving from the first base station and a second set of subframes for receiving from the second base station.

16. The method of claim 15, wherein the TDM pattern comprises a pattern of radio frames having a first set of radio frames for receiving from the first base station and a second set of radio frames for receiving from the second base station.

17. The method of claim 1, further comprising:
indicating a UE capability to the first base station and the second base station, wherein the UE capability comprises a single transmission and the TDM pattern.

18. The method of claim 17, wherein the first base station and the second base station allocate the TDM pattern during the handover based on the UE capability.

19. The method of claim 1, wherein if the first set of subframes is asynchronous with the second set of subframes, the UE avoids transmitting to the first base station or the second base station in at least some subframes in the pattern of subframes of the TDM pattern.

20. An apparatus for wireless communication at a User Equipment (UE), comprising:
a memory; and
at least one processor coupled to the memory and configured to:
receive an indication, from a first base station serving the UE, to handover from the first base station to a second base station;
establish a connection with the second base station;
maintain a connection with the first base station over a period of time during the handover; and
communicate with the first base station and the second base station during the period of time based on a time division multiplexing (TDM) pattern,
wherein the TDM pattern comprises a pattern of subframes having a first set of subframes for transmitting to the first base station and a second set of subframes for transmitting to the second base station, and the TDM pattern is based on whether the first set of subframes is asynchronous with the second set of subframes.

21. An apparatus for wireless communication at a User Equipment (UE), comprising:
means for receiving an indication, from a first base station serving the UE, to handover from the first base station to a second base station; and
means for establishing a connection with the second base station;
means for maintaining a connection with the first base station over a period of time during the handover; and
means for communicating with the first base station and the second base station during the period of time based on a time division multiplexing (TDM) pattern,
wherein the TDM pattern comprises a pattern of subframes having a first set of subframes for transmitting to the first base station and a second set of subframes for transmitting to the second base station, and the TDM pattern is based on whether the first set of subframes is asynchronous with the second set of subframes.

22. A method of wireless communication at first base station connected to a User Equipment (UE), comprising:
receiving a measurement report from the UE;
exchanging a time sharing pattern with a second base station;
transmitting an indication to the UE to handover from the first base station to the second base station, wherein the indication further indicates the time sharing pattern for time division multiplexing (TDM) communication with the first base station and the second base station over a period of time during the handover from the first base station to the second base station,
wherein the time sharing pattern comprises a pattern of subframes, and the time sharing pattern is based on whether the first base station is asynchronous with the second base station.

23. The method of claim 22, further comprising:
receiving communication from the UE based on the time division multiplexing (TDM) pattern during the period of time.

24. The method of claim 22, wherein the indication to handover to the second base station comprises a radio resource control (RRC) connection reconfiguration message to the UE.

25. The method of claim 24, wherein the period of time begins when the UE receives the RRC connection reconfiguration message.

26. The method of claim 25, wherein the period of time ends when the first base station receives a context release message from the second base station or when the first base station receives a message from the UE indicating a handover failure.

27. The method of claim 26, wherein a medium access control (MAC) control element (MAC-CE) indicates at least one of the context release message or a release of the TDM pattern.

28. The method of claim 22, wherein the time sharing pattern comprises a pattern of radio frames.

29. The method of claim 28, wherein the pattern of subframes indicates subframes in one or more radio frames.

30. The method of claim 22, wherein the time sharing pattern is based on whether the first base station is synchronous with the second base station.

31. An apparatus for wireless communication at a first base station, comprising:
a memory; and
at least one processor coupled to the memory and configured to:
receive a measurement report from the UE;
exchange a time sharing pattern with a second base station;
transmit an indication to the UE to handover from the first base station to the second base station, wherein the indication further indicates the time sharing pattern for time division multiplexing (TDM) communication with the first base station and the second base station over a period of time during the handover from the first base station to the second base station, wherein the time sharing pattern comprises a pattern of subframes, and the time sharing pattern is based on whether the first base station is asynchronous with the second base station.

32. An apparatus for wireless communication at a first base station, comprising:
means for receiving a measurement report from the UE;
means for exchanging a time sharing pattern with a second base station;
means for transmitting an indication to the UE to handover from the first base station to the second base station, wherein the indication further indicates the time sharing pattern for time division multiplexing (TDM) communication with the first base station and the second base station over a period of time during the handover from the first base station to the second base station,
wherein the time sharing pattern comprises a pattern of subframes, and the time sharing pattern is based on whether the first base station is asynchronous with the second base station.

33. A method of wireless communication at a second base station, comprising:
exchanging a time sharing pattern with a first base station for communication with a User Equipment (UE) during a handover;
establishing a connection with the UE;
receiving communication from the UE in a time division multiplexing (TDM) pattern based on the time sharing pattern exchanged with the first base station, wherein the communication is received over a period of time during a handover,
wherein the TDM pattern comprises a pattern of subframes, and the time sharing pattern is based on whether the first base station is asynchronous with the second base station.

34. The method of claim 33, wherein the period of time begins when the UE receives the RRC connection reconfiguration message.

35. The method of claim 34, wherein the period of time ends when the second base station transmits a context release message to the first base station.

36. The method of claim 35, wherein a medium access control (MAC) control element (MAC-CE) indicates at least one of the context release message or a release of the TDM pattern.

37. The method of claim 33, wherein establishing the connection with the UE comprises:
establishing a timing synchronization with the UE.

38. The method of claim 33, wherein establishing the connection with the UE comprises:
communicating with the UE over a random access channel (RACH).

39. The method of claim 33, wherein the time sharing pattern is exchanged with the first base station in handover signaling with the first base station.

40. The method of claim 33, wherein the TDM pattern comprises a pattern of radio frames.

41. The method of claim 40, wherein the pattern of subframes indicates subframes in one or more radio frames.

42. The method of claim 33, wherein the time sharing pattern is based on whether the first base station is synchronous with the second base station.

43. An apparatus for wireless communication at a second base station, comprising:
a memory; and
at least one processor coupled to the memory and configured to:
exchange a time sharing pattern with a first base station for communication with a User Equipment (UE) during a handover;
establish a connection with the UE;
receive communication from the UE in a time division multiplexing (TDM) pattern based on the time sharing pattern exchanged with the first base station, wherein the communication is received over a period of time during a handover,
wherein the TDM pattern comprises a pattern of subframes, and the time sharing pattern is based on whether the first base station is asynchronous with the second base station.

44. An apparatus for wireless communication at a second base station, comprising:
means for exchanging a time sharing pattern with a first base station for communication with a User Equipment (UE) during a handover;
means for establishing a connection with the UE;
means for receiving communication from the UE in a time division multiplexing (TDM) pattern based on the time sharing pattern exchanged with the first base station, wherein the communication is received over a period of time during a handover,
wherein the TDM pattern comprises a pattern of subframes, and the time sharing pattern is based on whether the first base station is asynchronous with the second base station.

* * * * *